(12) United States Patent
Østby et al.

(10) Patent No.: US 11,988,744 B2
(45) Date of Patent: May 21, 2024

(54) LIGHT SOURCE POSITION SENSOR

(71) Applicant: UNIVERSITETET I OSLO, Oslo (NO)

(72) Inventors: Joar Martin Østby, Oslo (NO); Philipp Dominik Häfliger, Oslo (NO)

(73) Assignee: UNIVERSITETET I OSLO, Oslo (NO)

( * ) Notice: Subject to any disclaimer, the term of this patent is extended or adjusted under 35 U.S.C. 154(b) by 851 days.

(21) Appl. No.: 16/978,764

(22) PCT Filed: Mar. 7, 2019

(86) PCT No.: PCT/EP2019/055784
§ 371 (c)(1),
(2) Date: Sep. 7, 2020

(87) PCT Pub. No.: WO2019/170836
PCT Pub. Date: Sep. 12, 2019

(65) Prior Publication Data
US 2020/0408907 A1    Dec. 31, 2020

(30) Foreign Application Priority Data

Mar. 7, 2018 (GB) ..................................... 1803670

(51) Int. Cl.
*G01C 3/08* (2006.01)
*G01S 7/48* (2006.01)
(Continued)

(52) U.S. Cl.
CPC ............ *G01S 17/06* (2013.01); *G01S 7/4804* (2013.01); *G01S 3/7862* (2013.01)

(58) Field of Classification Search
None
See application file for complete search history.

(56) References Cited

U.S. PATENT DOCUMENTS 4,794,245 A   12/1988  Auer
4,874,937 A   10/1989  Okamoto
(Continued)

FOREIGN PATENT DOCUMENTS

EP    1189072 A2 *  8/2001   ............. G01S 3/784
FR    2690788 A1 * 11/1993   ............. G01S 3/783
(Continued)

OTHER PUBLICATIONS

Notification of Transmittal of International Search Report and Written Opinion (Form PCT/ISA/220), International Search Report (Form PCT/ISA/210), and Written Opinion (Form PCT/ISA/237) for International Application No. PCT/EP2019/055784 dated Jun. 3, 2019, 16 pages.

(Continued)

*Primary Examiner* — Mark Hellner
(74) *Attorney, Agent, or Firm* — Withrow + Terranova, PLLC; Vincent K. Gustafson

(57) ABSTRACT

There is provided a sensor device, a sensor module, and methods for determining a position of a light source. The sensor device comprises a plurality of sensor units, each sensor unit having a respective sensor area. The sensor device also comprises a mask disposed above the plurality of sensor units and arranged such that incident light from the light source will illuminate different regions of the sensor area of each one of the sensor units depending on the position of the light source relative to the sensor device. The position of the light source may therefore be determined based on which regions of the sensor area of the sensor units are illuminated. Further, each sensor unit is arranged to be controlled by a respective unit controller to determine the position of the light source.

19 Claims, 14 Drawing Sheets

(51) Int. Cl.
*G01S 17/06* (2006.01)
*G01S 3/786* (2006.01)

(56) References Cited

U.S. PATENT DOCUMENTS

| | | | |
|---|---|---|---|
| 5,483,060 A | | 1/1996 | Sugiura et al. |
| 7,924,415 B2* | | 4/2011 | Leviton ................ G01S 3/7862 356/139.02 |
| 9,671,489 B1 | | 6/2017 | Aina et al. |
| 2005/0007504 A1 | | 1/2005 | Fergason |
| 2016/0123801 A1 | | 5/2016 | Bahreyni |

FOREIGN PATENT DOCUMENTS

| | | |
|---|---|---|
| GB | 2266634 A | 11/1993 |
| JP | S59220610 A | 12/1984 |

OTHER PUBLICATIONS

Search Report under Section 17(5) for United Kingdom Patent Application No. 1803670.7 dated Aug. 6, 2018, 5 pages.

Farian, Lukasz, et al., "Miniaturized Sun sensor with in-pixel processing for Attitude Determination of micro space probes", 2015 International Conference On Event-Based Control, Communication, and Signal Processing (EBCCSP), pp. 1-6, IEEE, Jun. 17, 2015.

Farian, Lukasz, et al., "A Miniaturized Two-Axis Ultra Low Latency and Low-Power Sun Sensor for Attitude Determination of Micro Space Probes", IEEE Transactions on Circuits and Systems I: Regular Papers, vol. 65, pp. 1543-1554, Nov. 2, 2017.

Ortega et al., "A Miniaturized Two Axis Sun Sensor for Attitude Control of Nano-Satellites", IEEE Sensors Journal, vol. 10, pp. 1623-1632, Jun. 10, 2020.

* cited by examiner

Fig. 1 Vertical cross-section and horizontal view of the sun sensor structure, $d = 356$ μm, $h = 100$ nm, $W = 50$ μm, $l = 2256$ μm.

| step | Pixel number: | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| t0 | Initial | 0 | 0 | 1 | 1 | 0 | 1 | 1 | 0 | 0 | 0 | 0 | 1 | 0 | 0 |
| t1 | LP | 0 | 1 | 1 | 1 | 1 | 1 | 1 | 1 | 0 | 0 | 0 | 1 | 0 | 0 |
| t2 | HP | 0 | 0 | 1 | 1 | 1 | 1 | 1 | 0 | 0 | 0 | 0 | 0 | 0 | 0 |
| t3 | HP | 0 | 0 | 0 | 1 | 1 | 1 | 0 | 0 | 0 | 0 | 0 | 0 | 0 | 0 |
| t4 | HP | 0 | 0 | 0 | 0 | 1 | 0 | 0 | 0 | 0 | 0 | 0 | 0 | 0 | 0 |
| t5 | HP(Zero) | 0 | 0 | 0 | 0 | 0 | 0 | 0 | 0 | 0 | 0 | 0 | 0 | 0 | 0 |
Fig. 10
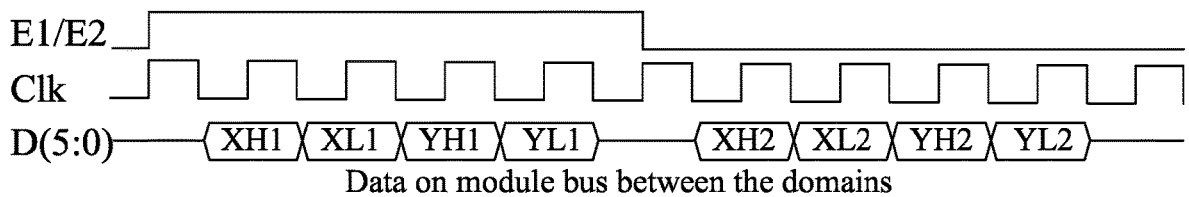
Data on module bus between the domains
Fig. 11
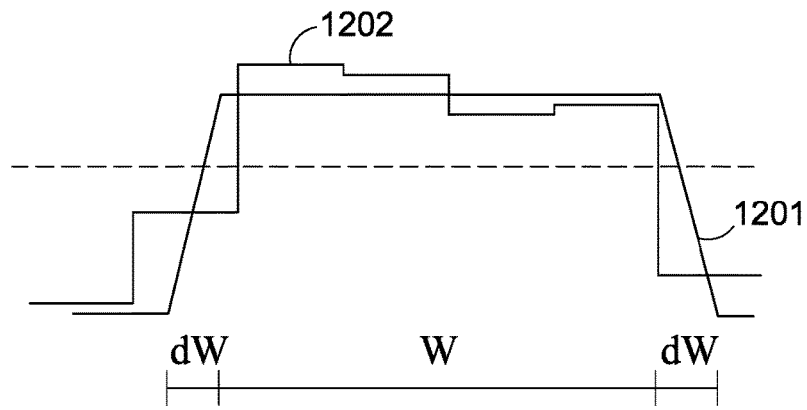
Fig. 12

LIGHT SOURCE POSITION SENSOR

CROSS-REFERENCE TO RELATED APPLICATIONS

This application is a 35 U.S.C. § 371 national phase filing of International Application No. PCT/EP2019/055784 filed on Mar. 7, 2019, and claims the benefit of United Kingdom Patent Application No. 1803670.7 filed on Mar. 7, 2018, wherein the disclosures of the foregoing applications are hereby incorporated by reference herein in their respective entireties.

FIELD OF THE INVENTION

The present invention relates to a sensor for determining a position of a light source and methods of determining a position of a light source using the sensor. Particularly, the invention relates to a sun sensor for a satellite.

BACKGROUND

Sensors for detection of sun position are well known and range from very low-tech to extreme high-tech solutions. When such sensors are to be used in space satellites or rockets, the robustness and reliability is important. Furthermore, for micro space probes, the weight and volume is also of high importance.

A sensor for the micro space probes is known from Farian et al. ('*A Miniturized Two-Axis Ultra Low Latency and Low-Power Sun Sensor for Attitude Determination of Micro Space Probes*', IEEE Transactions on Circuits and Systems, 2017). Therein, sensor units comprising two linear sensors orthogonally oriented to each other are disclosed. FIG. 1 shows a sensor according to Farian. The sensor 10 comprises a sensor unit 12 on a chip 13. A mask 14 comprises a transparent portion 15 which permits light 16 to fall on the sensor unit 12. The position of a light source may be determined by which part of the sensor unit 12 is illuminated.

However, Farian does not consider how to arrange the sensor in a detector module. Typically, to provide a field of view (FOV) over a full hemisphere, five sensors are affixed on respective surfaces of a cubic support structure. US 2016/0123801 A1 discloses a sensor structure including a pyramid structure, with light-sensitive areas and electrical contacts on each outward facing surface of the pyramid. The light source's position is determined by comparison of signals from different light sensitive areas.

However, there remains a need for a robust, reliable, light-weight, and small sensor with a full hemisphere field of view.

SUMMARY OF INVENTION

According to a first aspect of the present invention there is provided a sensor device for determining a position of a light source, the sensor device comprising: a plurality of sensor units, each sensor unit having a respective sensor area; and a mask disposed above the plurality of sensor units and arranged such that incident light from the light source will illuminate different regions of the sensor area of each one of the sensor units depending on the position of the light source relative to the sensor device, so that the position of the light source may be determined based on which regions of the sensor area of the sensor units are illuminated; wherein each sensor unit is arranged to be controlled by a respective unit controller to determine the position of the light source.

Each one of the plurality of sensor units may be used to determine the position of the light source, and therefore a plurality of measurements of the light source position may be taken by the sensor device, one for each of the plurality of sensor units. The sensor unit may comprise any suitable mechanism for detecting light incident thereon, and may comprise a plurality of light sensitive pixels in any suitable arrangement. The light sensitive pixels of the sensor unit therefore comprise the sensor area.

The mask comprises a transparent portion to permit light from the light source to pass through it to illuminate different regions of the sensor area of each one of the sensor units, and comprises a non-transparent portion to prevent light illuminating the other regions of the sensor area of each one of the sensor units. The mask is spaced from the sensor units by a predetermined amount so that for each position of the light source relative to the sensor device, different regions of the sensor areas of each sensor unit will be illuminated (i.e. the shadow of the mask will be different for different positions of the light source, thereby illuminating different regions of the sensor areas). Thus, by measuring which parts of the sensor area are illuminated, the position of the light source relative to the sensor device may be determined.

The sensor device may be substantially planar, and may therefore define a normal vector normal to the plane of the sensor device. The sensor device may be a sensor circuit and may be formed on a single printed circuit board or the like. The sensor device may therefore have a 'field of view' (FOV) defined by the maximum angle that the light source can be positioned from the normal vector while still illuminating a region of the sensor unit and hence being detectable thereby. The sensor device may determine the direction in which the light source is located relative to the sensor device.

Each sensor unit may comprise a first strip and a second strip substantially orthogonal to the first strip, and the mask may be arranged such that the light source will illuminate regions of both strips of each sensor unit simultaneously. That is, each sensor unit (and respective sensor area) may be substantially L-shaped and the mask may be arranged to illuminate regions of each line of that L shape simultaneously. The sensor strips of the sensor units may be immediately adjacent one another (e.g. at the corner of the L shape), or may be slightly spaced from each other. Although the first and second strips are preferably oriented substantially orthogonally, they may be at any angle from each other e.g. so long as they extend at least some distance in two dimensions.

Since each sensor unit defines a sensor area that extends in two dimensions of a plane, each sensor unit may be operable to determine the orientation of the light source with respect to the sensor device and hence may determine its direction with respect to the normal of the sensor device (i.e. the light source's polar coordinates in the spherical cap visible to the sensor units).

The first and second strips may preferably be substantially the same length, though they may be different lengths if required. Orthogonal strips of equal length may provide the same field of view in two dimensions.

Each strip of the sensor units may be a single row of pixels, or any other suitable light-sensitive mechanism. Thus, by measuring which pixel(s) on each strip are illuminated and determining their location relative to the mask, the direction (i.e. relative position) of the light source may be determined.

The sensor units may be configured such that their pixels generate a signal when their accumulated charge (from incident light) increases beyond a threshold value. In this manner, the sensor units may be 'event driven' so that readings are provided only for significant illumination. As such, the processing necessary to operate the sensor units may be reduced.

The sensor units may be adjacent one another. The sensor units may be arranged such that the first strips of each sensor unit are substantially parallel and the second strips of each unit are substantially parallel. The first strips of the sensor units may be adjacent each other, and the second strips may be adjacent each other. Thus, the L-shaped sensor units may be nested together in a space-saving arrangement. As such, the strips of the sensor units may extend along two sides of a square, thus bounding half of that square. If the sensor device is formed on a circuit board, the square which is half-bounded by the strips may be filled with other relevant components so as to make the sensor device relatively compact.

The mask may comprise a first transparent slit and a second transparent slit substantially orthogonal to the first transparent slit. That is, the transparent portion of the mask may be L-shaped. The first transparent slit may be disposed orthogonally to the first strips of the sensor units and its middle may be disposed directly above the middles of each first strip. The second slit may be disposed orthogonally to the second strips of the sensor units and its middle may be disposed directly above the middles of each second strip. Thus, the mask may be L-shaped like the sensor units but rotated by 180 degrees relative thereto (in the plane of the sensor device).

Each strip of each sensor unit may comprises a plurality of pixels, and the pixels of each strip may be offset from the pixels of each adjacent strip by a distance less than a width of each pixel in the direction of offset. The pixels may be offset by a fraction of the pixel width equal to the reciprocal of the number of sensor units in the sensor device. For example, where there are three sensor units, the pixels may be offset by one third of the pixel width.

By such an offset, the resolution of the sensor device may be may be improved, since each sensor unit will detect the light source at a slightly different position.

The sensor device may comprise graded shielding to reduce the intensity of light incident on the sensor units so as to counteract a relative intensity decrease of light incident on the sensor unit at an angle. The reduction of intensity of light incident at an angle may be relative to that of light incident directly onto the sensor unit. The mask may be graduated so as to counteract a relative decrease in intensity of light which is incident on the sensor unit at an angle. Light incident directly on the sensor device (i.e. from a light source along the normal vector) will be transmitted through the mask onto relevant regions of the sensor areas of the sensor units (e.g. onto the middle of each strip). Light which is incident on the sensor device at an angle from the normal will pass through the mask at an angle and will fall on a region of the sensor area at that angle. As such, its intensity will be reduced (proportional to the cosine of the angle from the normal). For example, light incident at an angle of 60 degrees from the normal will have 50% of the intensity of light incident from the normal, since the cosine of 60 degrees is 0.5. Thus, the transparency of the transparent portion of the mask may be graduated or graded so that it transmits a greater proportion of light that is incident at an angle than it does light which is incident from directly above. Hence, the sensor units may receive approximately the same intensity of light regardless of the position of the light source.

The graduation may be smooth, so that the mask permits increasingly more light through regions further from its centre and permits the least light through the transparent portion of the mask directly over the sensor units. The graduation may be inversely proportional to the cosine of the angle of incidence from the normal vector to the sensor device.

The sensor device may be configured so that each sensor unit is arranged to be part of a respective power domain. That is, the sensor device may be configured such that during use each sensor unit is powered by a separate power supply, so that failure of any one power supply will not affect operation of the sensor units in the other power domains.

The sensor device may be a micro sensor for a satellite or the like. It may be less than 1 centimetre by 1 centimetre, may be less than 5 millimetres by 5 millimetres, and may be less than 2.5 millimetres by 2.5 millimetres. The sensor device may be substantially planar, albeit having sufficient depth for the mask to be spaced from the sensor units.

According to a second aspect of the present invention there is provided a sensor module for determining a position of a light source, the sensor module comprising: a plurality of sensor devices as recited in reference to the first aspect of the invention; and a plurality of unit controllers configured to control one sensor unit in each of the plurality of the sensor devices, wherein each sensor device comprises one of the plurality of unit controllers.

The unit controllers may each be operationally distinct from the others and as such may function entirely independently from the others. There may therefore be the same number of unit controllers as there are sensor devices, with each unit controller controlling a sensor unit in each of the sensor devices. There may therefore be the same number of sensor units in each sensor device as there are sensor devices in the sensor module. Each unit controller may be configured to control only one sensor unit in each sensor device.

Each sensor device may comprise a respective one of the unit controllers. The unit controller of each sensor device may therefore be configured to control a sensor unit in the same sensor device as the unit controller, and one sensor unit in each of the other sensor devices. As such, each unit controller may be arranged to operate sensor units having respective fields of view determined by the orientation of each sensor device. The sensor devices may be oriented in different directions so as to provide overlapping and/or complementary fields of view. Each unit controller may therefore have a field of view comprising that of all of the sensor devices.

The sensor module may have a field of view covering at least a full hemisphere, and may therefore be able to detect the position of the light source anywhere in that hemisphere (i.e. in any direction in that hemisphere). Each unit controller of each sensor device of the sensor module may therefore be able to detect the position of the light source in any direction in a full hemisphere. Therefore, the plurality of unit controllers may provide redundant light source position detection means in case of e.g. a failure of one or more unit controllers.

The sensor module may be configured so that each unit controller belongs to a respective power domain. The power domains may be separate and distinct from one another so that failure of any domain will not affect operation of the others. Each power domain may include a unit controller, as well as one sensor unit of the same sensor device as the unit controller. The power domain may include all of the sensor units controlled by the unit controller.

The sensor module may comprise a plurality of module controllers, and each module controller may be configured to control each of the plurality of unit controllers. That is, each module controller may control all of the unit controllers and there may be the same number of module controllers as unit controllers and sensor devices. Each module controller may be operationally distinct from the other module controllers, and hence may function entirely independently thereof. The sensor module may be configured so that only one of the module controllers controls the unit controllers at any one time.

Each sensor device may comprises a respective a module controller, that module controller being configured to control the unit controller of the same sensor device, as well as the unit controllers of all the other sensor devices in the sensor module.

Each module controller may be configured to communicate with a system controller, such as a satellite control system or the like. The module may be arranged such that only one module controller is operable to communicate with the system controller at any one time. The sensor module may be configured so that a redundant module controller takes over communication with the system controller in the event of a failure of the module controller that was previous communication with the system controller.

An arrangement as described herein allows each sensor device to be identical, each comprising a plurality of sensor units, a unit controller, and a module controller. The manufacture and construction of the sensor module may therefore be simplified.

In an embodiment of the sensor device, the sensor units are each substantially L-shaped and adjacent each other so that they bound two sides of a square or rectangle. The unit controller of the sensor device and/or the module controller of the sensor device may each be positioned at least partly (and may be mostly or fully) within the square or rectangle bounded by the sensor units. The unit controller and/or module controller may be adjacent both of the first and/or second strips of the sensor units, and may be adjacent each other. In this way, the sensor device may be compact and the space occupied thereby may be made as small as possible.

The sensor module may comprise a base and three sensor devices arranged on respective faces of the base, wherein the base has the shape of at least a portion of a tetrahedron. The base may be shaped like a tetrahedron without a top cap. The tetrahedral base may have the shape of a regular tetrahedron and may support the sensor devices in a predetermined positioning. The tetrahedral base may be mounted to a surface (e.g. of a satellite or any other suitable device) at the fourth face and may thereby provide sensor coverage over the hemisphere above the surface by the positioning of the sensor devices. The sensor devices may be evenly spaced about the tetrahedral base to provide the sensor module with a field of view including at least the whole hemisphere above the module (i.e. 180 degrees around the module's azimuth and 90 degrees of the module's altitude). The module may provide a field of view greater than a hemisphere. Accordingly, in one embodiment of the sensor module, three sensor devices are each positioned parallel to a surface plane of a tetrahedron, one sensor device on each plane facing outwards if the sensor module is mounted on a surface. In another embodiment of the sensor module, three sensor devices are each positioned parallel to a surface plane of a regular tetrahedron, one sensor device on each plane facing outwards if the sensor module is mounted on a surface.

Alternatively, the sensor module may comprise any suitable shaped base to position the sensor devices as needed. For example, the base may be a square pyramid, a pentagonal pyramid, etc.

By such an arrangement, each unit controller may be operable to detect (by at least one sensor unit in a respective sensor device) a light source at any position within the hemisphere above the sensor module. Each module controller may compare measurements from each of the unit controllers. Each module controller may be operable to determine an average of the light source position measurements and may be configured to communicate that average to the system controller. Each module controller may be configured to determine the light source position as the mean position, or as the median position. By taking the median position, erroneous or outliers measurements may be neglected and the reliability of the sensor module may be improved.

The sensor module may be a micro space probe and may be less than 100 millimetres in size, less than 50 millimetres in size, and preferably less than 25 millimetres in size. The sensor module may be a sun sensor for a satellite, a sounding rocket or the like.

According to a third aspect of the present invention there is provided a sensor system for determining a position of a light source, the sensor system comprising a plurality of sensor modules as described herein with reference to the second aspect, wherein each sensor module is arranged to have a different field of view for detection of the light source.

The sensor system may be arranged to detect the light source over a wider field of view than may be available using only a single sensor module. The sensor modules of the sensor system may be arranged to detect the light source in opposing directions. The sensor system may comprise two sensor modules, and may comprise only two sensor modules. The two sensor modules may be arranged to each detect the light source in opposite hemispheres, and the sensor system may therefore provide a field of view over an entire sphere (i.e. a field of view in all directions) so that the position of the light source may be detected in any direction using at least one or the sensor modules.

The sensor system may comprise a system controller arranged to communicate with and/or control each of the plurality of module controllers. Each of the plurality of module controllers may be operable to send a signal to the system controller.

According to a fourth aspect of the present invention there is provided a satellite comprising a sensor system as described herein with reference to the third aspect of the invention, and/or comprising a sensor module as described herein with reference to the second aspect of the present invention, and/or comprising a sensor device as described herewith with reference to the first aspect of the present invention.

According to a fifth aspect of the present invention there is provided a method of determining a position of a light source using a sensor device as recited with reference to the first aspect or using a sensor module as recited with reference to the second aspect, comprising: determining the position of the light source to be an average of the positions determined by the sensor units.

The method may include determining the average to be the mean of the positions, or may include determining the average to be the median of the positions. By taking the median, errors which distort the measurements may be reduced.

The method may comprise: (i) reading digital output pixel values from one of the sensor units; (ii) setting to 1 any pixel values neighbouring pixel values of 1; (iii) setting to 0 any pixels values neighbouring a 0 value; (iv) repeating step (iii) until performing step (iii) one more time would result in all pixel values of the sensor unit being set to 0; and (v) determining the position of the light source using the remaining non-zero pixel or pixels. The method may comprise in step (ii) setting to 1 any pixel values surrounded by (i.e. neighbouring on both sides) pixel values of 1.

The remaining non-zero pixel or pixels will be taken as the illuminated region of the sensor unit. If the remaining non-zero pixel is a single pixel, then that pixel may be taken as the measured position of the illumination from the light source. If a plurality of pixels remain as non-zero, then the measured position of the light source's illuminate may be taken to be the average position of those pixels.

The method may comprise using a sensor system as recited herein with reference to the third aspect, or a satellite as recited herein with reference to the fourth aspect.

According to a sixth aspect of the present invention there is provided a method of determining a position of a light source using a sensor device as recited with reference to the first aspect, or using a sensor module as recited with reference to the second aspect, comprising: (i) reading digital output pixel values from one of the sensor units; (ii) setting to 1 any pixel values neighbouring pixel values of 1; (iii) setting to 0 any pixels values neighbouring a 0 value; (iv) repeating step (iii) until performing step (iii) one more time would result in all pixel values of the sensor unit being set to 0; and (v) determining the position of the light source using the remaining non-zero pixel or pixels.

The method may comprise repeating step (ii) a plurality of times. Step (ii) may be an OR function that eliminates pixels stuck at 0, and may be done in one or two stages. Step (iii) may be an AND function and may eliminate pixels stuck at 1, and may also find the light gravity point (e.g. analogous to the centre of mass of an object). The method may comprise in step (ii) setting to 1 any pixel values surrounded by (i.e. neighbouring on both sides) pixel values of 1.

Such a method may be used to determine from a sensor unit a centre of the illuminated region, thereby simplifying the measurement of the light source position. The method may therefore simplify the logic needed for detection of the light source position and may reduce dynamic power consumption of the sensor module.

The method may comprise using a sensor system as recited herein with reference to the third aspect, or a satellite as recited herein with reference to the fourth aspect. The method may comprise determining a position of a light source as described herein with reference to the fifth aspect.

LIST OF FIGURES

Certain preferred embodiments of invention will be described below by way of example only and with reference to the accompanying drawings in which:

FIG. 10 shows pixels values according to steps of a digital signal processing method;

FIG. 11 shows data on a module bus between domains of a sensor module;

FIG. 12 shows an example of light intensity on a sensor unit;

FIG. 13 shows pixels values according to a distributed digital signal processing method;

FIG. 14 shows pixels values according to a modified distributed digital signal processing method;

SPECIFIC DESCRIPTION

Figure 2:
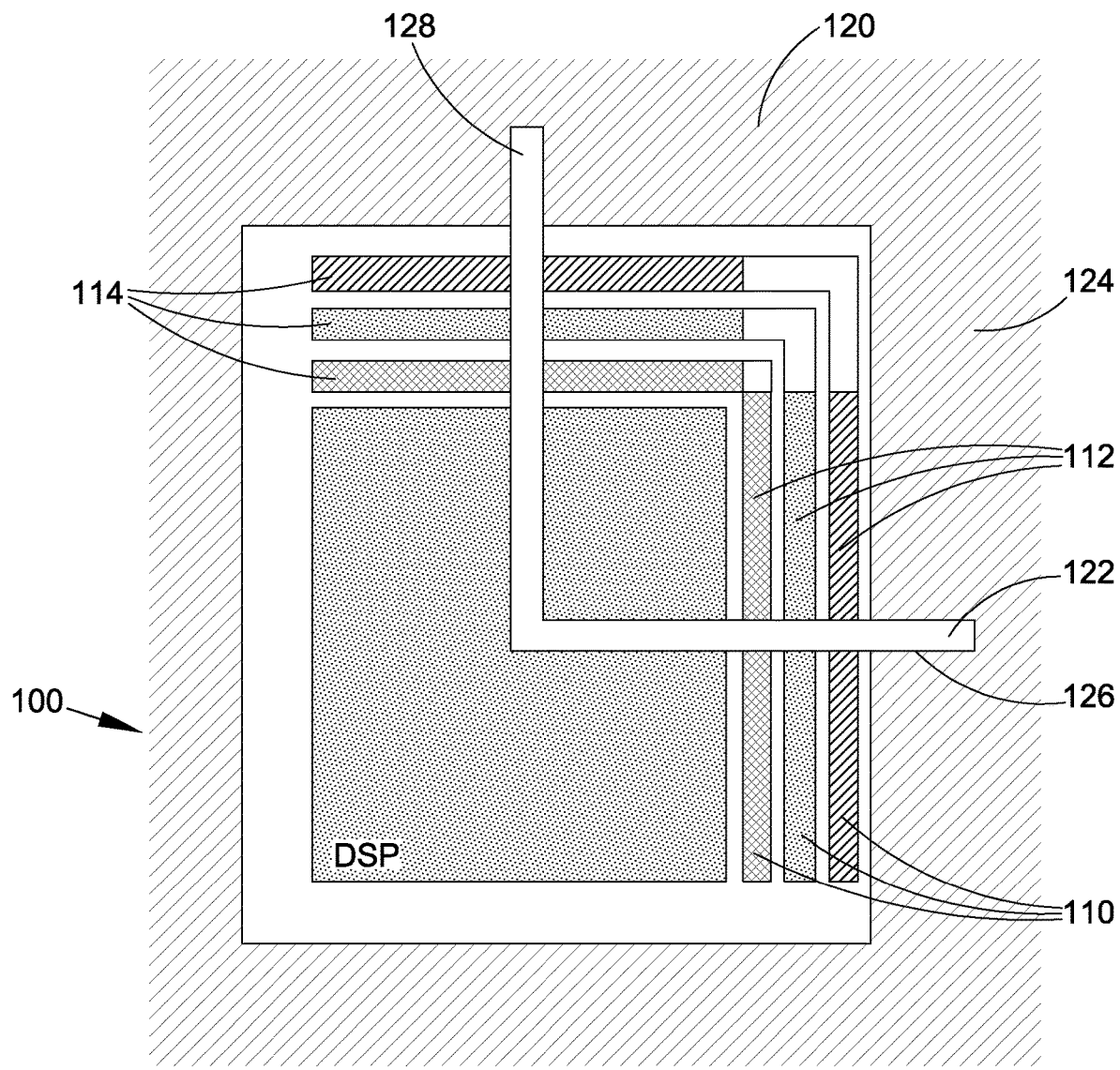
FIG. 2 shows an example of a sensor device comprising a plurality of sensor units.

FIG. 2 shows a sensor circuit 100 (also called a sensor device, or sensor element) according to the present disclosure comprising multiple sensor units 110 which are configured to operate independently. The sensor circuit 100 comprises a mask 120 comprising a transparent portion 122 and a non-transparent portion 124. The transparent portion 122 and the non-transparent portion 124 permit light to illuminate specific different regions of the sensor units 110 depending on the orientation of a light source with respect to the sensor circuit 100. Thus, the position of a light source (or its direction relative to the sensor device 100) may be determined by measuring which regions of the sensor units 110 are illuminated.

Any failure one L-sensor unit 110 will not influence the others since each may function independently, and may belong to respective, separate signal and power domains. Accordingly, the reliability of the sensor circuit 100 may be improved without increasing the surface needed by the sensor circuit 100 (and hence without increasing its size). When multiple sensor units 110 are functioning together, they may also improve the resolution of the sensor device 100.

Each sensor unit 110 comprises a first strip 112 and a second strip 114 disposed orthogonally to the first strip 112. As such, the first and second strips 112, 114 extend in two dimensions in the plane of the sensor device 100, allowing two dimensional measurement of the light source's position. The transparent portion 122 of the mask 120 comprises a first transparent slit 126 and a second transparent slit 128. The first transparent slit 126 is disposed orthogonally to the first strips 126 of each of the sensor units 110, and the second transparent slip 128 is disposed orthogonally to the second strips 114 of each of the sensor units 110. The transparent portion 122 of the mask 120 is therefore L-shaped, similarly to the shape of the sensor units 110, albeit rotated in the plane of the sensor device by 180 degrees with respect to the sensor units 110.

The first transparent slit 126 is disposed above (e.g. directly above) the centres of the first strips 112 of the sensor units 110. Therefore, movement of the light source in the direction defined by the first strips 112 will cause the shadow of the mask 120, and hence the light passing through the first slit 126, to move. As such, the light falling on the first strips 112 via the first slit 126 will move in the opposite direction along the first strips 112. Similarly, movement of the light source in the direction defined by the second strips 114 will cause the light passing through the second slit 128 to move in the opposite direction along the second strips 114.

Figure 3A:
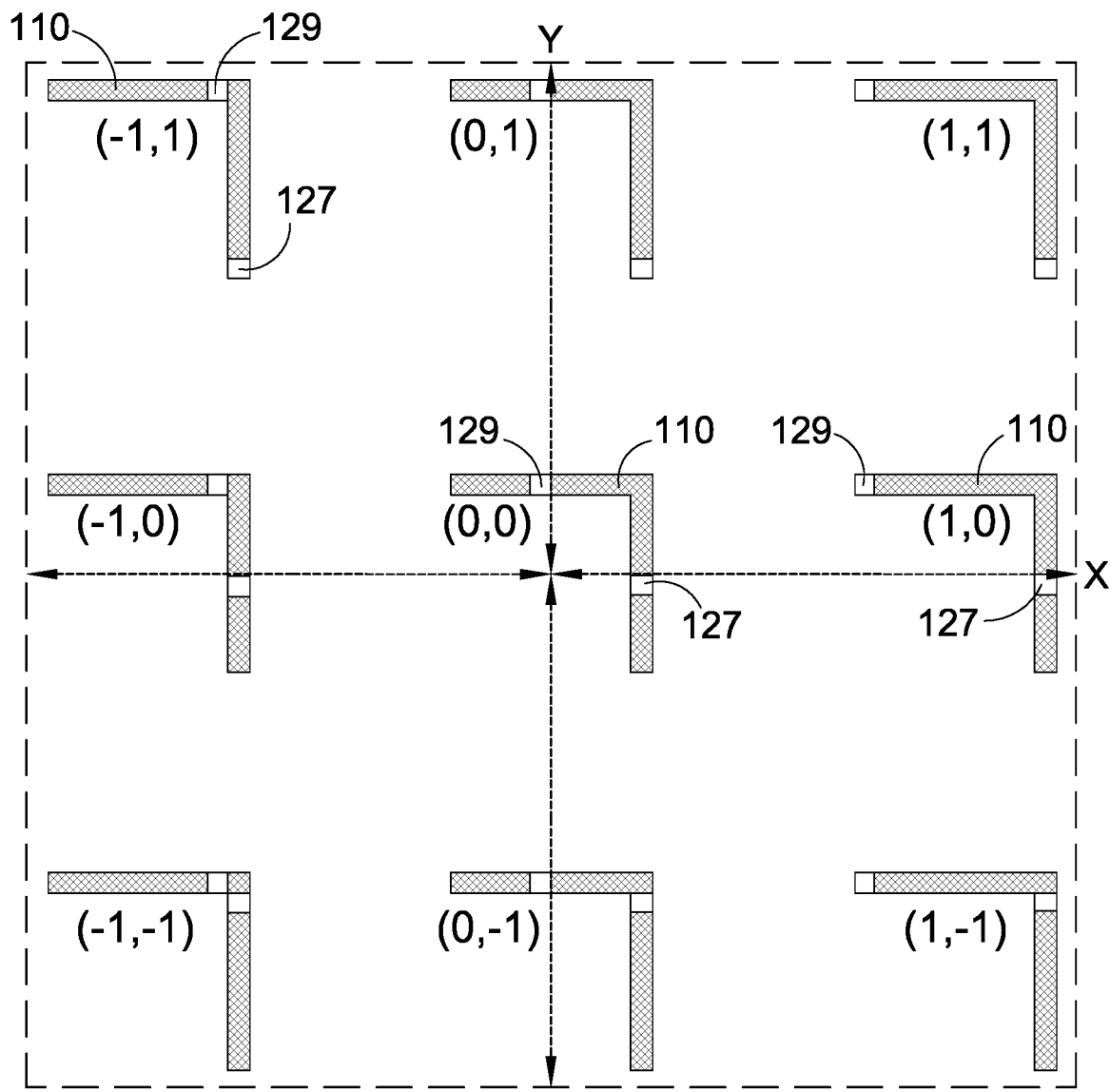
FIG. 3A illustrates how the position of a light source may be measured by a sensor unit.

FIG. 3A shows an illustration of the locations of illuminated regions on a sensor unit 110 depending on the location of the light source with respect to the sensor device 100. The coordinates are given in arbitrary units on X- and Y-axes, and only a single sensor unit 110 is shown for simplicity. When the light source is directly above the sensor device 100 (i.e. in the direction of the normal vector from the surface of the sensor device), the first transparent slit 126 of the transparent portion 122 of the mask 120 will create a first illuminated region 127 on the first strip 112 of the sensor unit 110 directly below the first slit 126. The second slit 128 of the mask 120 will create a second illuminated region 129 on the second strip 114 of the sensor unit 110 directly below the second slit 128. This situation is shown in the centre of FIG. 3 for coordinate (0, 0).

If the light source is moved away from the normal in the X-direction only, to the coordinate (1, 0), then the second illuminated region 129 will move in the opposite X-direction while the first illuminate region 127 remains on the same position on the first strip 112 of the sensor unit 110. If the light source instead moves to the coordinate (−1, −1), then both the first and second illuminated regions 127, 129, will move on the sensor unit 110 as shown. Different position of the light source will cause different regions of the sensor unit 110 to be illuminated. Thus, the position of the light source relative to the sensor device 100 can be determined based on which regions of the sensor unit 110 are illuminated.

Figure 3B:
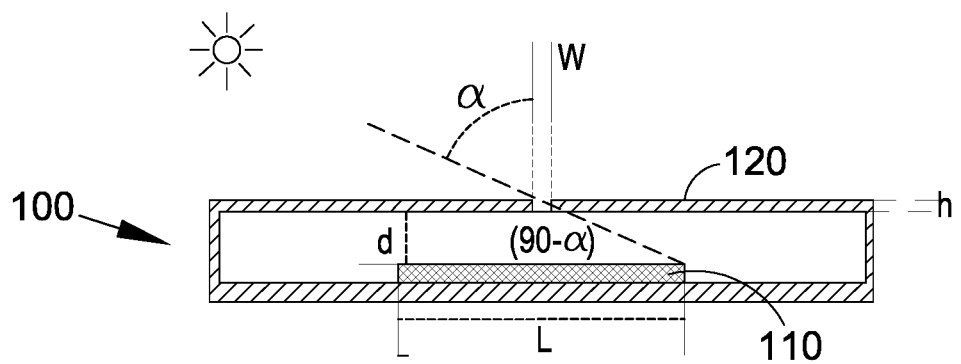
FIG. 3B shows an example of a light source at an angle α illuminating a sensor unit.

FIG. 3B shows the light source disposed at an angle α from the normal to the planar sensor device 100. The angle α of the light and the distance d between the mask 120 and the sensor element 110 determine where the light hits the sensor unit 110. The field of view of the sensor device depends on the ratio L/d, where L is the length of the sensor unit in the corresponding direction. A high L/d ratio gives a large field of view. In the depicted implementation of FIG. 3B, the width of the transparent slit (W) is 50 μm, the thickness of the mask 120 (h) is 100 nm, the distance between the mask 120 and the sensor unit 110 (d) is 356 μm, the length of the sensor unit (L) is 2256 μm, and the pixel pitch is 11.75 μm. The strip of the sensor unit 100 comprises 192 pixels equally distributed over its length 2256 μm.

The sensor units 110 are located next to each other so that the first strips 112 are parallel and adjacent and the second strips 114 are parallel and adjacent. Due to the arrangement of multiple sensor units 110 on the sensor device, it is possible to obtain multiple measurements of a light source's position using a single mask 120 and without a significant increase in the size of the sensor device 100. The sensor device 100 therefore provides redundancy with respect to measurements of the light source's position.

Figure 4:
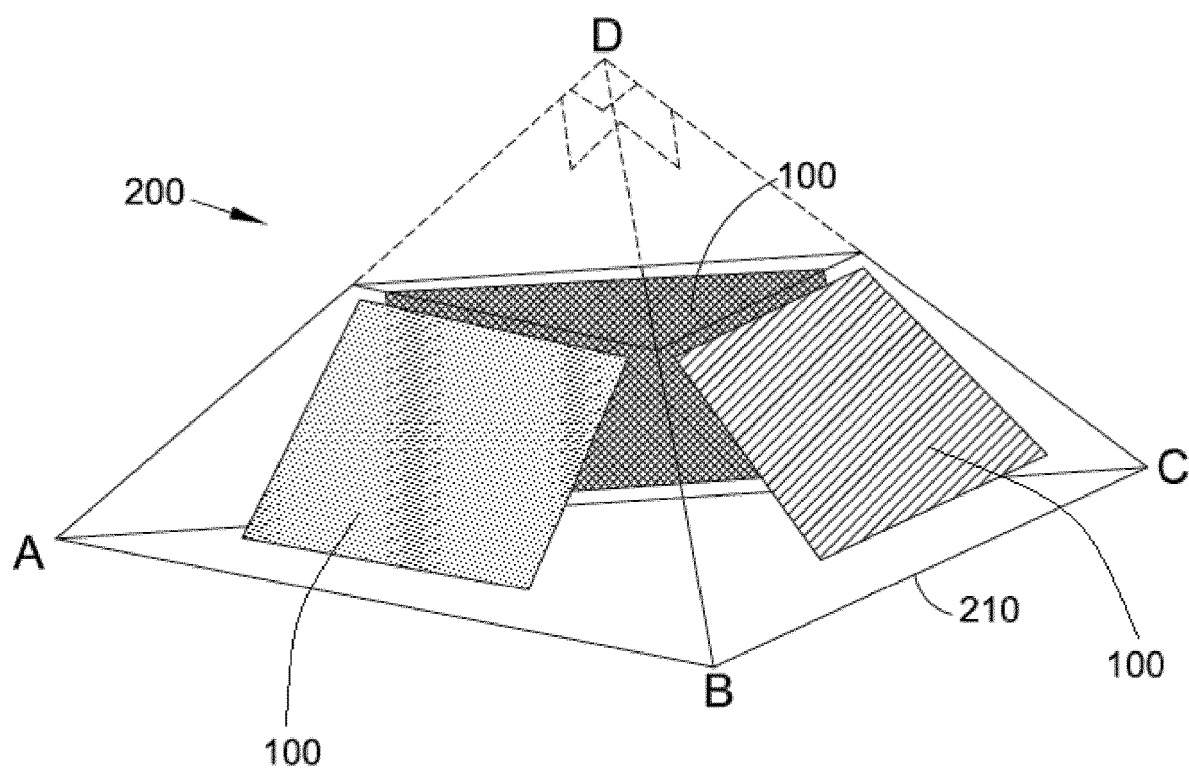
FIG. 4 shows a sensor module comprising a plurality of sensor devices.

FIG. 4 shows a sensor module 200 comprising three sensor elements 100 (i.e. sensor devices 100, or sensor circuits 100); wherein the sensor elements 100 are each positioned parallel to respective surface planes of a tetrahedron 210, one on each plane facing outwards if the sensor module 200 is mounted on a surface. This allows a full hemisphere field of view (FOV) with as little as three sensor elements 100, occupying a minimal volume. Such an arrangement also allows FOV overlap contributing to an increased resolution.

Figure 5:
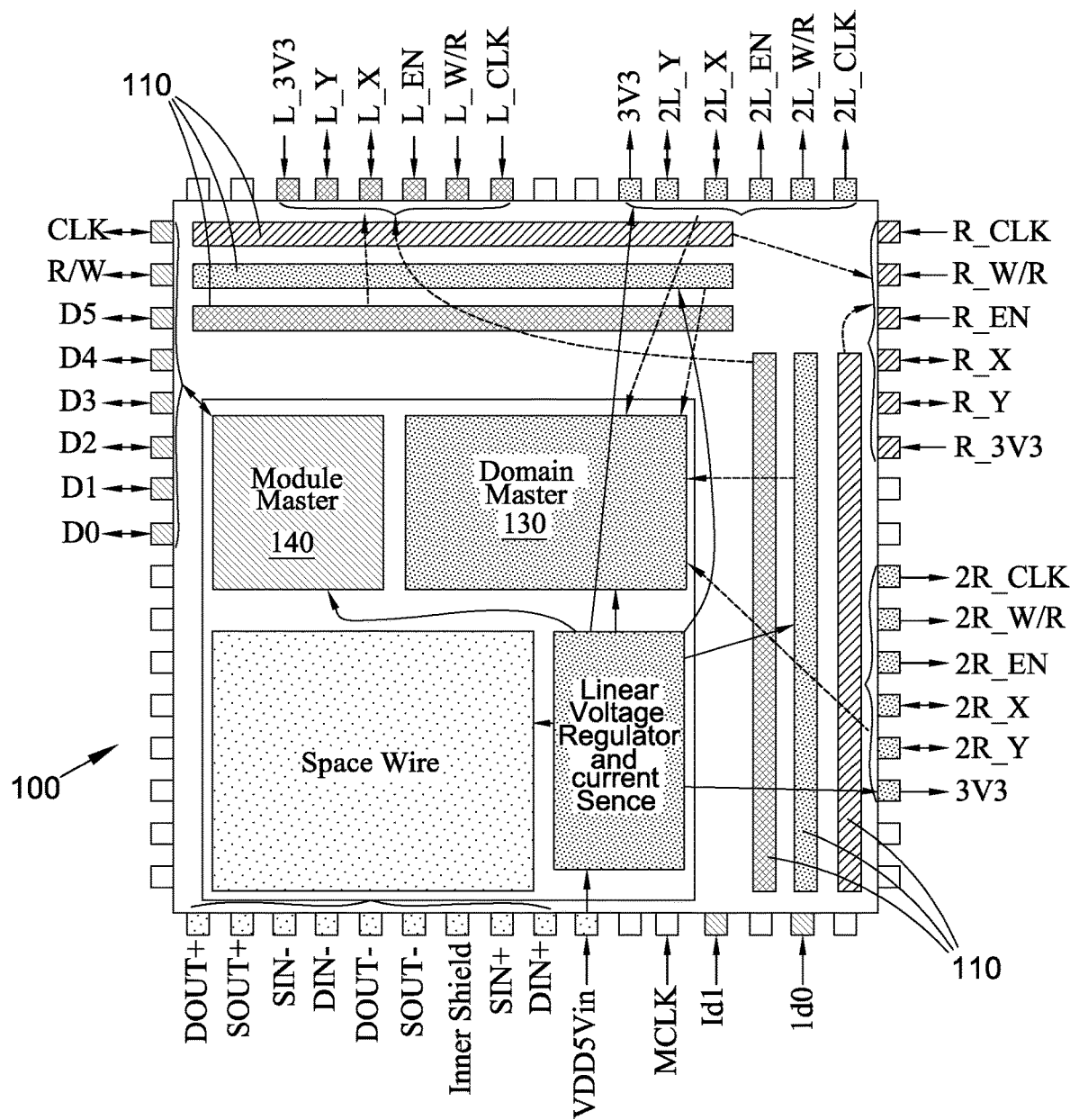
FIG. 5 shows an exemplary layout of a sensor device.

The present disclosure also provides a sensor module 200 which is improved with respect to several other technical effects. For example, the pixel readout may be event driven. After a common reset, pixels generate an event signal when their accumulated charge (from light) passes a threshold value. This requires little processing power. Depending on the number of sensor units 110, each sensor element 100 may thus comprise the processing units 130. FIG. 5 shows a sensor element 100 comprising a processing unit 130 configured to control sensor units 110 (i.e. a unit controller 130). The unit controller 130 is configured to control one sensor unit 110 of the same sensor element 100. The unit controller 130 is further configured to control sensor units 110 on other sensor elements 100 of the sensor module 200.

Figure 6:
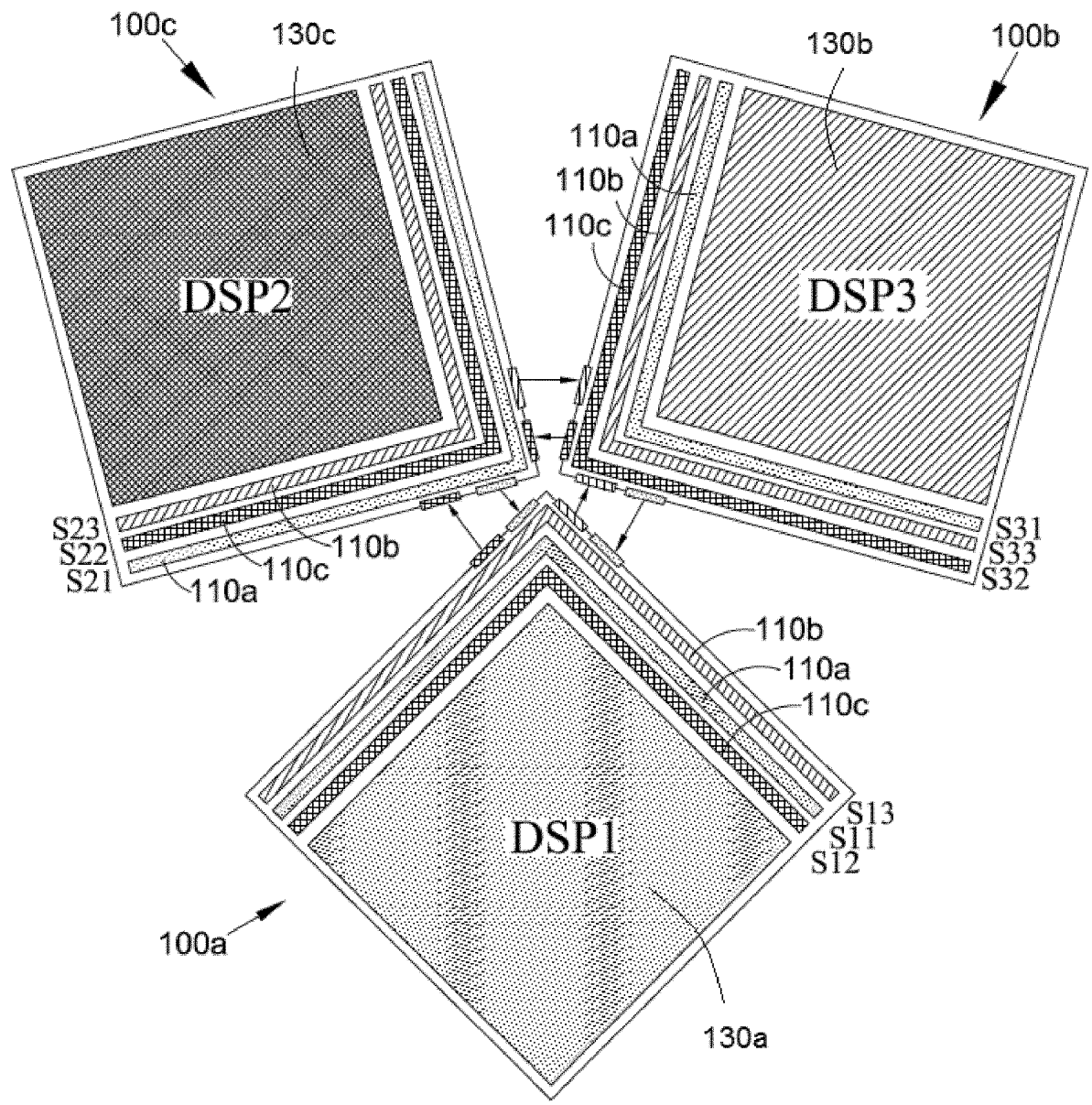
FIG. 6 shows a schematic of the signal and power domains for three sensor devices of a sensor module.

FIG. 6 shows an exemplary arrangement of sensor elements 100a, 100b, 100c. Unit controllers 130a-c on each sensor element 100a-c belong to distinct power and signal domains, and are arranged to control respective sensor units 110a-c, one sensor unit 110a-c on each sensor element 100a-c. In this way, each unit controller 130 is operable to sense the position of a light source via any of the sensor elements 100. Each sensor element 100a, 100b, 100c may comprise a respective module controller (140a, 140b, 140c) as shown in FIG. 5.

As seen in FIG. 6, due to the arrangement of a unit controller 130 and/or module controller 140 within the square bounded by the L-shaped sensor units 110, each sensor device 100 (i.e. sensor element 100) may be arranged compactly to occupy as little space as possible and hence each sensor device, and consequently the sensor module and sensor system, may be as small as possible.

Figure 7:
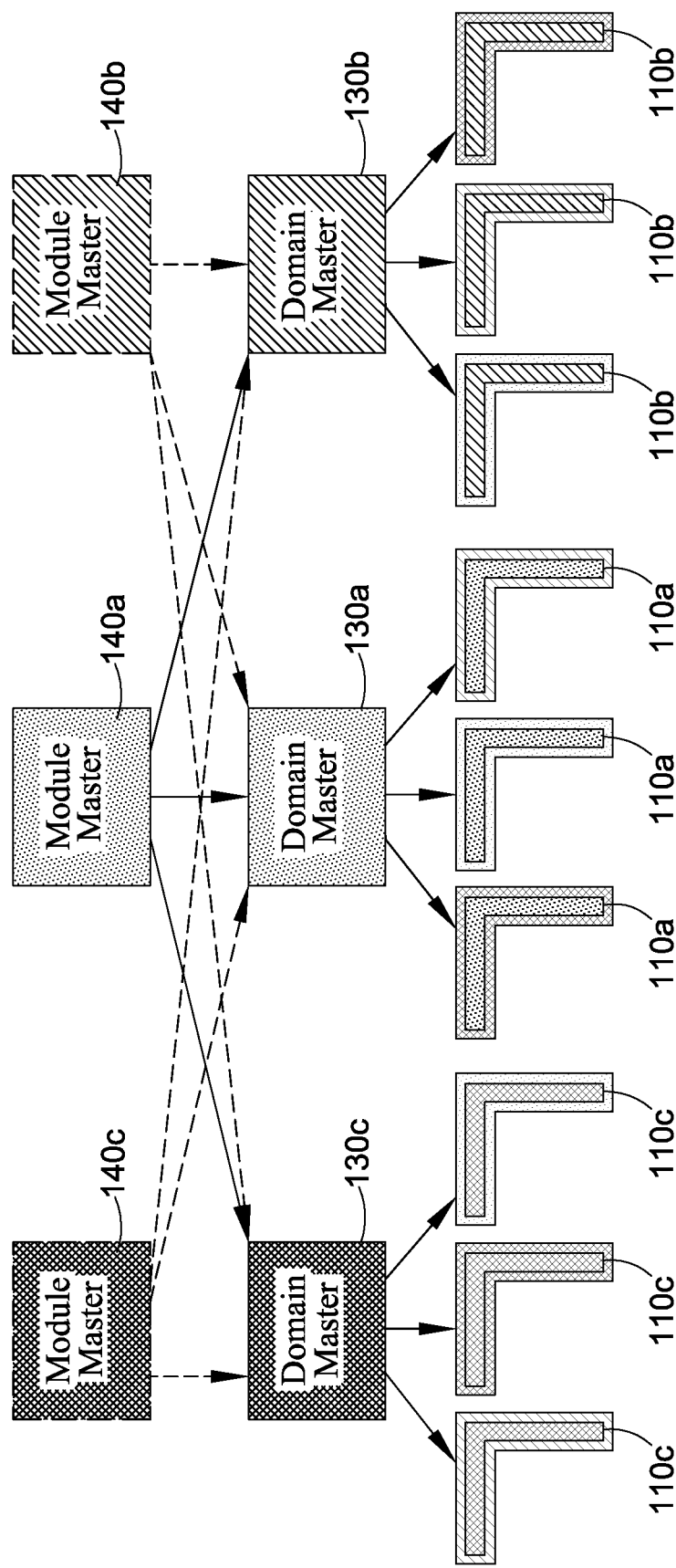
FIG. 7 shows a schematic of the hierarchy of signal and power domains for a sensor module comprising unit controllers and module controllers.

The present invention may comprise a hierarchic organisation of the sensor elements 100 and sensor units 110 that provides robust and reliable operation of the sensor module 200. FIG. 7 shows a schematic of a hierarchical arrangement of the signal and power domains of a sensor module 200. The sensor module comprises three separate domains, one for each of the unit controllers 130. Each sensor element 100 comprises a module controller 140 (e.g. a module master 140) operable to control the entire sensor module 200 (see e.g. FIG. 5). Each module controller 140 is configured to control all of the unit controllers 130 (e.g. domain masters 130), and may be connected to each of the power domains. Each unit controller 130 is configured to control one (and only one) sensor unit 110 in each of the sensor elements 100.

Therefore, each unit controller 130 independently controls a plurality of sensor units 110 to detect a position of a light source. The respective domains of the unit controllers 130 are also independently powered. Each module controller 140 controls all of the unit controllers 130 and hence may be configured to compare the measured positions from all of them and make a final determination of the position of the light source. Each module controller may further be configured to send a signal indicative of the light source's position to system controller. The sensor module 200 may be configured such that only one module controller 140 controls the unit controllers 130 at any one time.

In addition to operating in different signal domains, the unit controllers 130 (together with their respective pluralities of sensor units 110) each have separate power domains. That is, each unit controller 130 functions entirely independently of the others, and if any of them suffers from a failure of their respective power supplies, the others will nevertheless continue to function. As such, the sensor module 200 provides redundancy in the event that any of the power domains are affected by a power failure. Each module controller 140 may belong to a single power domain (e.g. the same as that of the unit controller 130 of the same sensor device 100), or may belong to each of the power domains. Such an arrangement means that the sensor module 200 provides redundancy not only from a perspective of position measurement of the light source, but also in terms of power failure of any of the domains and/or sensor devices 100.

Figure 8:
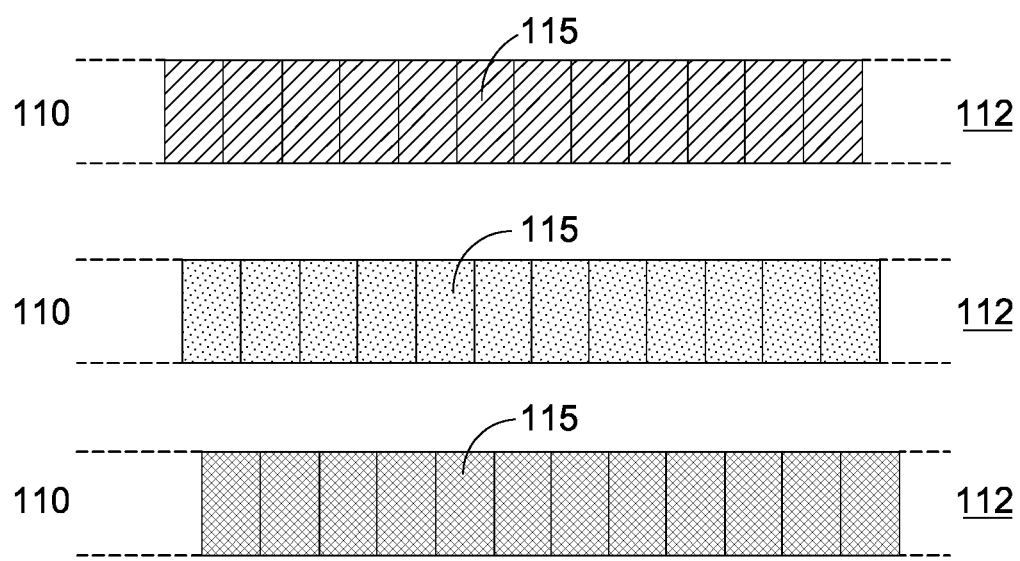
FIG. 8 shows an example of pixels arrangements within sensor units of a sensor device.

FIG. 8 shows a magnification of the first strips 112 of the sensor units 110 of each sensor device. Each strip comprises a plurality of pixels 115 arranged in a line. The pixels 115 of each strip 112 are shifted with respect to those of the adjacent strips 112. Such an arrangement may allow increased resolution of the sensor device 100. Each of the depicted lines of pixel 115 shows a portion of the strips 112 of the sensor unit 110. The pixels 116 of each strip 112 are shifted by ⅓ of the pixel pitch relative to each other. By combining the information from all domains, the resolution of the sensor device 110 may be improved by ⅓ of what each domain may provide alone.

Figure 9A:
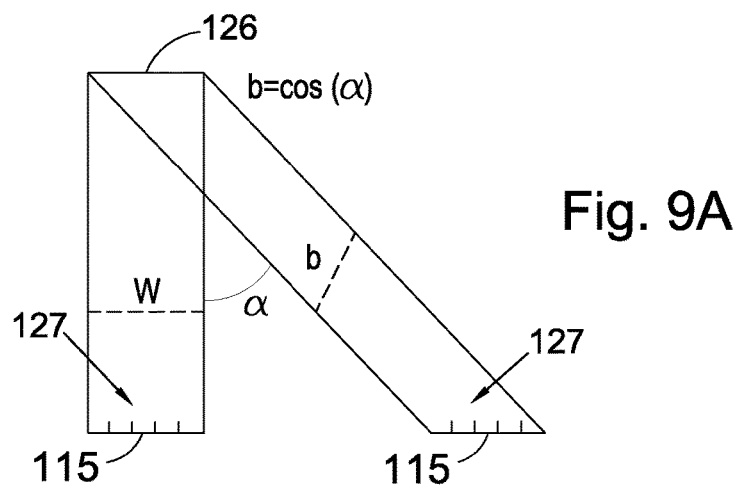
FIG. 9 illustrates the change in intensity of incident light on a sensor unit for different angles.

The sensor elements 100 may comprise graded pixel shielding. Such shielding may counteract a reduction in intensity caused by light falling on the sensor units at an angle from the normal vector. FIG. 9A shows an example of the change in intensity of the first illuminated region 127 with changing angle. The first illuminated region illuminates pixels 115 of the sensor unit 110. The number of pixels 115 illuminated will be equal for light hitting centrally and in the periphery. However, in the periphery the light intensity will be less (cos(a) times the maximum). The resolution (degrees/pixels) is higher at the periphery than in the centre.

Figure 9B:
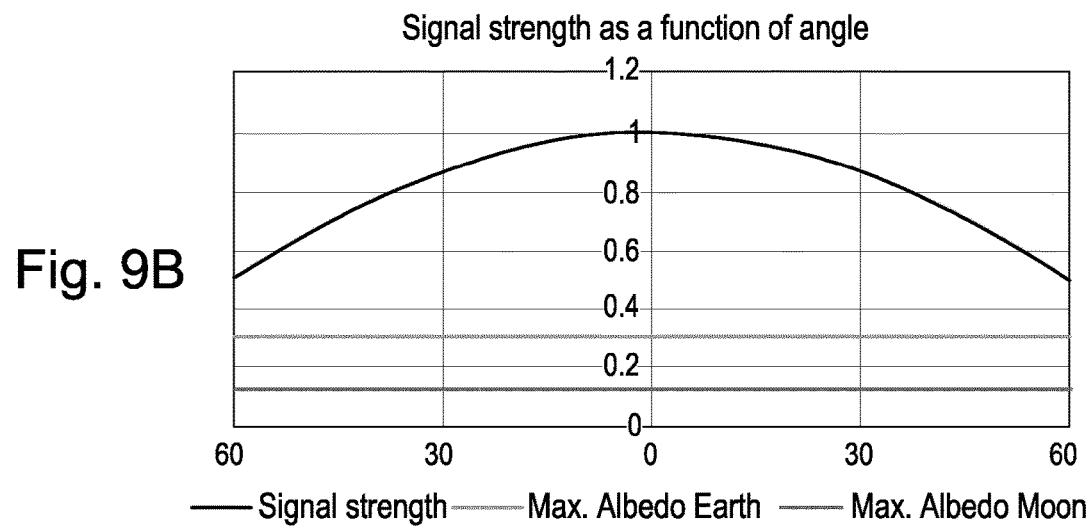

FIG. 9B shows the distribution of the signal strength as a function of the angle of the light source from the normal. Also shown for reference is the maximum albedo of the Earth and the maximum albedo of the moon. It can be seen from FIG. 9B that when the light source is at an angle of 60 degrees, the signal strength is 50% that of the signal when the light source is at 0 degrees.

Therefore, graded pixel shielding may be used to reduce the intensity of the incident light as required in order to even out the signal strength over the incident angles. For example, 50% of the surface of the central pixels may be covered with metal in order. Decreasing amounts of coverage may be used as the angle increases so that at the edges of the sensor unit no shielding is needed. The shielding may be located as needed within the sensor device to prevent light being incident on the pixels as needed. For example, the shielding may be included in the mask 120.

The sensor module may use distributed digital signal processing to improve its operation efficiency and reduce its power consumption. FIG. 10 shows the signals from a sensor strip according to consecutive steps of an exemplary distributed signal processing method. At time t0, each pixel 115 has either registered an event (1) or has not (0). In the first stage, any pixels 115 at 0 which are surrounded by pixels at 1 are set to 1. This removes unresponsive pixels from the signal. The result is shown at t1 in FIG. 10. In the next step, any pixels with a value of 1 which are neighbored by pixels with a value of 0, are set to 0 (see t2). This is repeated until repeating it one more time would result in all pixels being at 0 (see steps t3, t4, and t5).

This process requires minimal processing power and will determine the centre of the illuminated region (analogous to the centre of gravity of a mass) which may be used for determining the light source's location.

Figure 15:
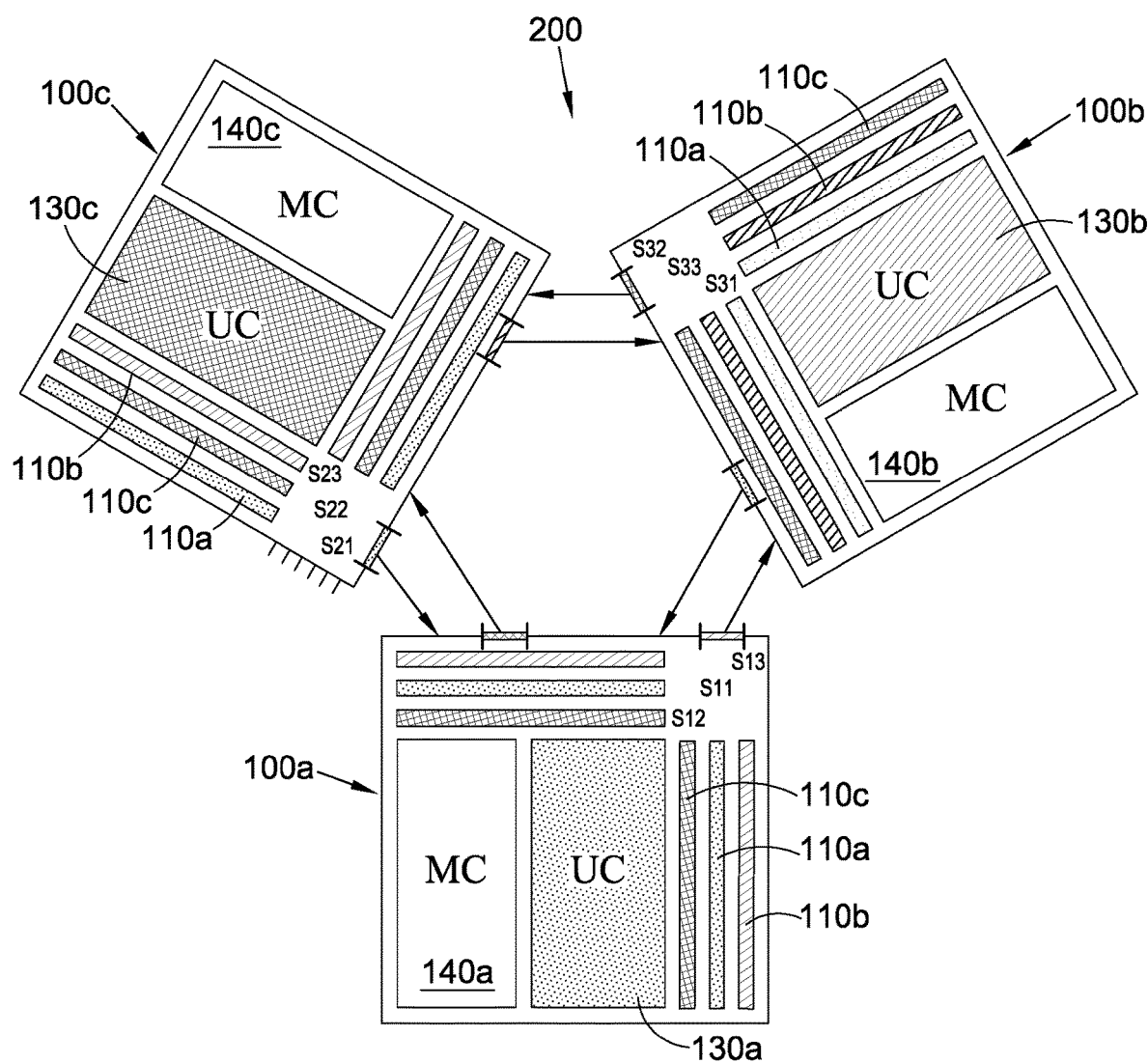
FIG. 15 shows a schematic of a sensor module including the signal and power domains for three constituent sensor devices.

FIG. 15 shows a schematic of a sensor module 200 comprising three sensor devices 100*a*, 100*b*, 100*c*. The arrangement is similar to that of FIG. 6, and unit controllers 130*a*, 130*b*, 130*c* and module controllers 140*a*, 140*b*, 140*c* shown for each sensor device 100*a*, 100*b*, 100*c* respectively. The arrangement and control hierarchy is the same as for the sensor module of FIG. 6.

The signal domains and power domains for the sensor module 200 of FIG. 15 are indicated by colouring or shading. The unit controller 130*a* of the first sensor device 100*a* is in the same signal domain as the sensor unit 110*a* on the same sensor device 100*a*. The signal domain contains one sensor unit 110*a* of each of the three sensor devices 100*a*, 100*b*, 100*c*. Each sensor unit 110*a* is therefore configured to send signals to the unit controller 130*a*. Each module controller 140 is operable to detect a light source via any one of the three signal domains managed by the unit controllers (i.e. domain masters) 130*a*, 130*b* and 130*c*. If there is a fault in any signal domain, two others are available as fallbacks so that the sensor module 200 can continue to function. Only one module controller (e.g. module controller 140*a*) will be in a role as a master controlling the sensor module 200 at any one time. The other two module controllers (e.g. module controllers 140*b* and 140*c*) may be in a sleep mode (e.g. ready to adopt control from the first module controller 140*a* in the event of a fault), or may be running in parallel checking the module controller (e.g. module controller 140*a*) with the master role. If both of the other module controllers (e.g. module controllers 140*b* and 140*c*) disagree with the module in role as the master (e.g. module controller 140*a*), then they may move the master role to one of the others.

The module controller 140*a* of the first sensor device 100*a* is in the same power domain as the unit controller 130*a* of the (same) first sensor device 100*a*, and the sensor units 110*a* (i.e. sensor elements 110*a*) on the same sensor device 100*a* and on the two other sensor devices 100*b* and 100*c*. The module controller 140*b*, unit controller 130*b* and sensor units 110*b* are similarly in the same power domain as each other. The same applies to the module controller 140*c*, unit controller 130*c*, and sensor units 110*c*. Each power domain is separate and independent of the others.

In the arrangement shown in FIG. 15, each power domain contains the same components as the signal domain plus the module controller on the same sensor device as the unit controller of the signal domain. Each power domain is powered from a separate, independent power source, so that if during use there is a fault in any one power domain (e.g. failure of a power source), then the sensor module 200 has further power domains available and is able to continue operation. The sensor module 200 therefore has triple redundancy in this respect.

Figure 16:
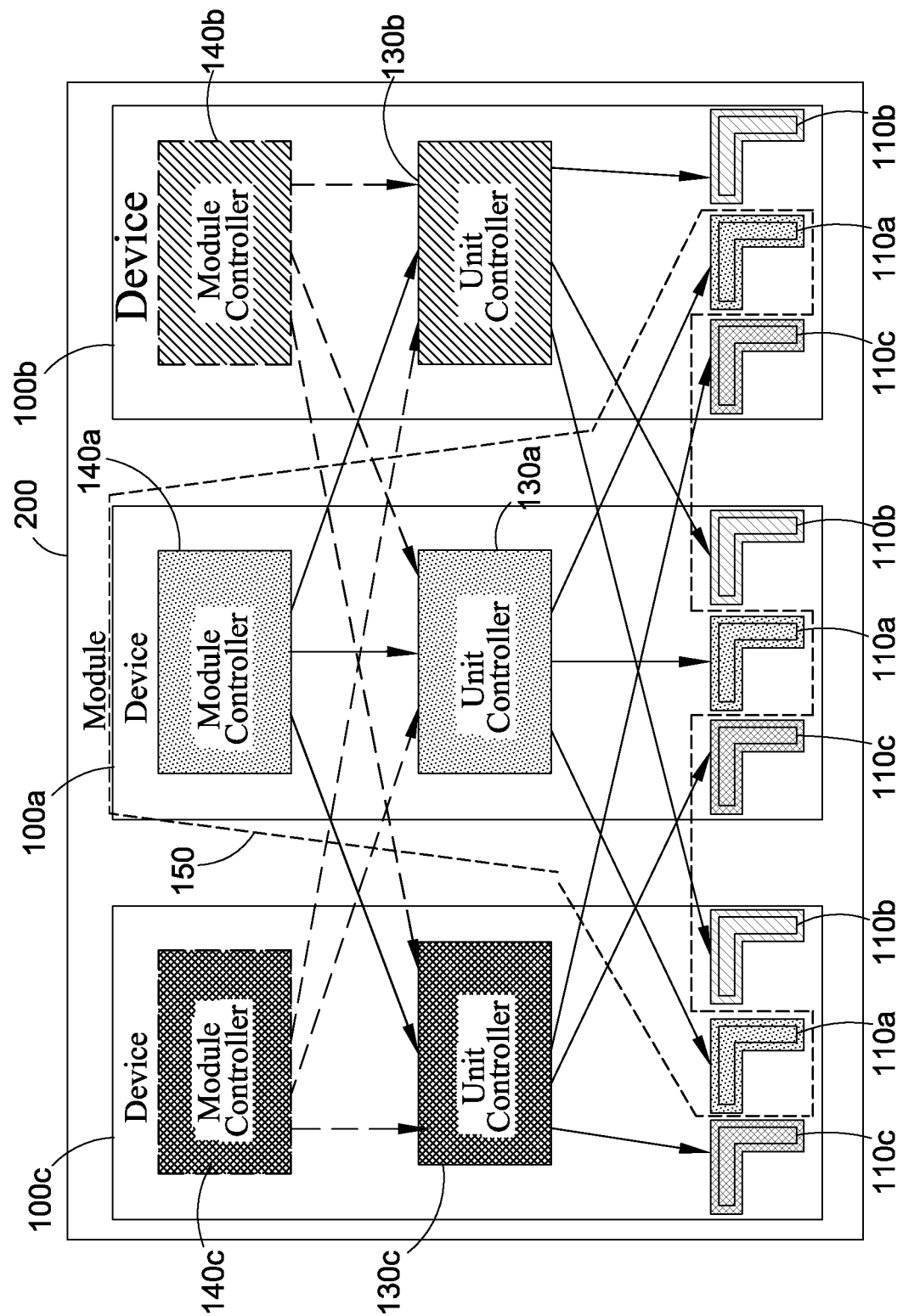
FIG. 16 shows a schematic control hierarchy for a sensor module comprising three sensor devices.

FIG. 16 shows a schematic signal and power hierarchy for a sensor module 200. The arrangement of FIG. 16 is the same as that of FIG. 7, and further shows each sensor device 100*a*, 100*b*, 100*c*. Each sensor device 100 is a physical unit (e.g. a circuitry device or the like) and is connected (e.g. logically and/or functionally) to the other sensor devices 100 in the sensor module 200 in the signal and power hierarchy shown. A power domain 150 of the unit controller 130*a* of the first sensor device 100*a* is shown as a dotted outline.

In this case, the power domain 150 includes one sensor unit 110*a* on each sensor device 100*a-c*, as well as a unit controller 130a and module controller 140a. Each power and signal domain therefore includes sensor units 110 from each sensor device 100. Whereas the sensor devices 100 are tangible components, the domains are logical (e.g. functional and/or electrical) groupings of sub-components of the sensor devices 100.

In the sensor module 200 shown in FIG. 16, the module controller 140a of the first sensor device 100a is in control of the entire sensor module 200, so that each of the unit controllers 130a, 130b 130c are controlled thereby and send signals thereto. Further, through each of the unit controllers 130a-c, all of the sensor units 110a-c on each of the sensor devices 100a-c are controlled by the first module controller 140a and send signals thereto.

The sensor module 200 comprises three power domains shown by the colouring or shading of the respective components or their outlines. Components of the same colouring or shading belong to the same power domain and are therefore powered by the same power source. The three power domains of the sensor module 200 are separate and independent. The sensor units 110a of each sensor device 100a-c are within the same power domain 150 (i.e. have the same power source) as the first module controller 140a and first unit controller 130a. Other sensor units 110, unit controllers 130 and module controllers 140 of the other sensor devices 100 have the same arrangement.

In the event that the first module controller 140a fails, the second module controller 140b is configured to adopt control of the sensor module 200. If the second module controller 140b should fail, the third module controller 140c is configured to adopt control of the sensor module 200. Therefore, the sensor module 200 has triple redundancy in this respect.

It will be appreciated that the term 'sensor device' is used herein interchangeably with the terms 'sensor element' and 'sensor circuit'. The term 'unit controller' is used interchangeably with the term 'domain master', and the term 'module controller' is used interchangeably with 'module master'.

Figure 17:
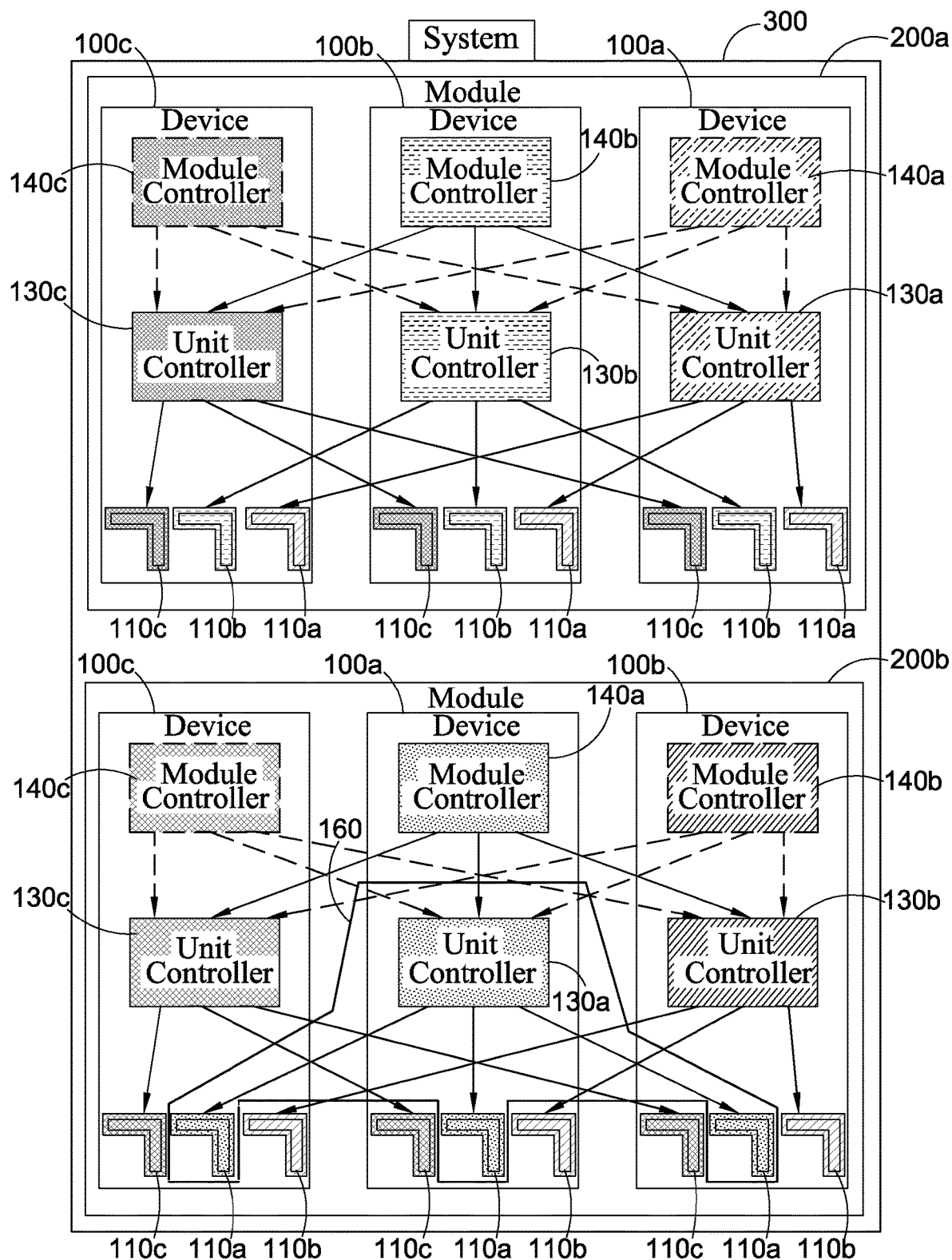
FIG. 17 shows a schematic control hierarchy for a sensor system comprising a plurality of sensor modules.

FIG. 17 shows a sensor system 300 comprising only two sensor modules 200a, 200b. The sensor modules 200a, 200b are each similar to the sensor module 200 in FIG. 16. However, in the first sensor device 100a of the second sensor module 200b, the signal domain 160 does not include the first module controller 140a. The power domains of each sensor module 200a, 200b are indicated by the colouring or shading of the components, so that components of the same colouring or shading belong to the same power domain and are therefore powered by separate, independent power supplies.

The first sensor module 200a is in this example controlled by the first module controller 140a which is right-most in FIG. 17. The second sensor module 200b is controlled by the first module controller 140a which is central in FIG. 17. The other module controllers 140b, 140c of each sensor module 200a, 200b are able to control their respective sensor modules 200a, 200b in the event of a fault or failure affecting the first module controller 140a.

FIG. 17 shows the signal domain 160 for the unit controller 130a of the sensor module 200b. All of the other unit controllers 130 have a similar signal domain. All of the module controllers 140 on the same module 200 have access to all signal domains 160 through the unit controllers 130.

The sensor system 300 comprises two sensor modules 200 each with a field of view covering a hemisphere or more. The sensor modules 200 may be arranged to view opposing hemispheres so that the sensor system 300 may be used to detect the position of a light source over an entire sphere (i.e. in any direction). Therefore, as few as six sensor devices 100 may be used to provide light source detection capability in all directions while ensuring detection accuracy and functionality redundancy. Each sensor module 200 has multiple redundancies for signal detection and power supply in a highly compact arrangement. Further, the provision of multiple sensor units 110 within a single sensor device 100 not only permits redundancy but may be used e.g. also to increase resolution (e.g. by offsetting pixels 115 of adjacent strips 112 of sensor units 110 as described with reference to FIG. 8).

Examples

The following provides a list of terms that occur herein:

Sensor line/strip: a one-dimensional line of light sensitive pixel sensors implemented on an integrated CMOS circuit.

Sensor unit (or L-sensor): two sensor lines orthogonally oriented in an "L" shape. A sensor unit can decide the positioning of a lighting object within two-dimensions.

Mask/Slotted shield: above the sensor unit there is a shield with an "L" shaped transparent opening oriented 180° relative to the sensor unit.

Domain: a domain is a functional area sharing signal and power. Different domains are completely independent and even fatal power supply shorts within one domain will not influence on the others. A domain may spread out over several physical devices and one physical device may have several domains.

Sensor device/element/circuit/ASIC: the physical integrated circuit hosting one or more sensor units from one or more domains.

Detector/sensor module: a module comprising the sensor circuits, other components, basement, chassis, housing etc. for hemisphere measurement.

Detector system: depending on the application, the detector system may comprise one or more detector modules. In the case of a satellite it may be two detector modules oriented in opposite directions.

X, Y and Z axis: the X, Y and Z axes are local references for each sensor circuit.

$\phi$ (phi) and $\theta$ (theta): polar references within a detector module. $\phi$ ranges from 0° to 360° and is in the direction of the X's (with an offset of 120°) while $\theta$ ranges from 0° to 90° and is in the direction of Y.

Event handling: each unit initiates a flag signal ("raises their hand") on a common shared line when a specified situation has occurred. This is different from "polling" where a central unit asks all elements one-by-one in turn.

A known sensor consists of one sensor circuit with one sensor unit. It was developed for sounding rockets and its functionality and specifications have been confirmed in lab. The known version has no redundancy. There are no radiation requirements and thus it has not been designed for such. It has a FOV (field of view) of 144° in both X and Y directions. It requires some external electronics to generate control signals etc. The known version is described in Farian et al.

The sensor of the present invention may comprise three equal sensor circuits in a tetragon pyramid structure. It may be developed for a broader range of applications from satellites in geostationary orbits to solar panels and windows blinds used on earth. Such embodiments of the present disclosure may provide triple redundancy and thus may be designed for high radiation tolerance. It may have a FOV significantly more than 180° (i.e. a hemisphere). It may require a minimum of external components.

Figure 1:
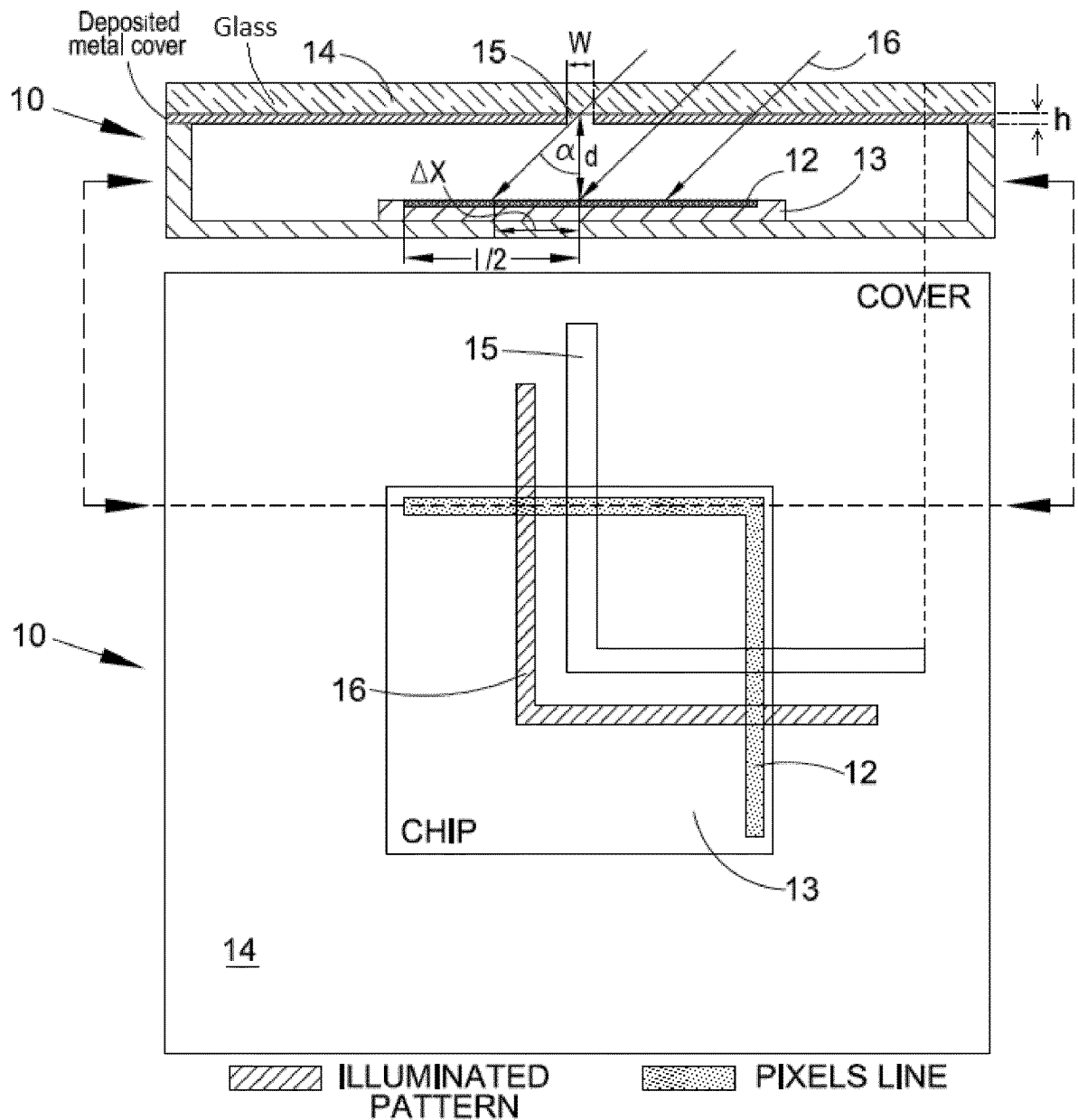
FIG. 1 shows an example of a sensor device comprising a single sensor unit.

An L-sensor is shown in FIG. 1 and comprises two orthogonally oriented sensor rows along two of the edges of a 2.5 mm×2.5 mm ASIC implemented in the 0.35 μm AMS CMOS Opto process. The pixel readout may be event driven. After a common reset, pixels generate an event signal when their accumulated charge (from light) passes a threshold value. Thus, the time from the reset until the event represents the light intensity. The number of events that can be read out is programmable.

Because the only analog element is the comparison of the pixel signal with a common threshold value inside each pixel, the analog part is kept at an absolute minimum. Thus, there is no need for ADCs or analog parts that may be radiation or noise sensitive. This simplifies the design and increases the reliability. The device supports a rather high measurement rate. If a better resolution is required and the rate is not high enough, the common threshold level may be reduced. This gives more events per time and more data to reduce the standard variation.

As shown in FIG. 1, the sensor circuit (largest red square) comprises two orthogonally oriented sensor lines (solid red). This is covered by a non-transparent slotted shield with two transparent slits (solid yellow) in an L-shape oriented 180° to the sensors.

The sensor and slit are positioned so that the cross points for each is in the centre of the other when the sun is perpendicular to the sensor plane.

The integrated circuit (sensor) has a size of 2.5 mm×2.5 mm. The package size is 9.5 mm×9.5 mm.

As shown in FIG. 3B, the angle of the sun-light and the distance between the slotted shield and the sensor element (d) decide where the light hits the sensor. The FOV depends on the L/d ratio where a high L/d gives a large FOV. In the depicted implementation, W=50 μm, h=100 nm, d=356 μm, L=2256 μm, pixel pitch=11.75 μm and 192 pixels equally distributed over 2256 μm.

As shown in FIG. 9A, the number of pixels illuminated will be equal for light hitting centrally and in the periphery. However, in the periphery the light intensity will be less ($\cos(\alpha)$ times the maximum). The resolution (degrees/pixels) is much higher at the periphery than in the centre.

FIG. 3A shows how the sun will fall on the sensor element depending on the position of the sun. Notice that the maximum angle $\alpha$ from the normal vector is in both the X and Y directions. Hence, the covered corners are $\alpha\sqrt{2}$ from the normal vector. Along the X and Y axis the FOV is $2\alpha$ while along the diagonals the FOV is $\alpha 2\sqrt{2}$.

The following Table compares the AO8884 requirements with an L-sensor. The FOV depends on the distance between the sensor and the slot. With the present distance (d=356 μm) the FOV is 144°, but the accuracy does not satisfy the accuracy requirement of 1°. However, in a three-dimensional structure with three sensors, each sensor only has to cover 120°. If the distance is adapted to this (d=651 μm), the circuit has a hardware accuracy of 1.03°. The number of pixels may be increased from 192 to 256 while the pixels accuracy will be 1.0°. The accuracy will be improved even further by interpolation and shifted redundant sensor lines.

| | The AO8884 specifications | | | |
|---|---|---|---|---|
| Fields | Requirements | Specification | L-sensor | |
| Cost | | 400000EUR | L-sensor | L-sensor |
| TRL | | 5 | Present version (d = 356 μm) | adapted to FOV = 120° (d = 651 μm) |
| Functional | Output | Sun direction in SC frame | Sun direction as pixel XY coordinates of brightest cells | |
| Performance (over full thermal & dynamic environment) | Angular accuracy (including tolerance to solar flares, SEU, albedo and straylight) | Over full FOV (180°): 5° (3σ) Accurate FOV (60°): 1° (3σ) (target 0.5°) | Margin 0.9% (=30.9%-30.0%) >60°: 0.17°-1.38° <60°: 1.38°-1.89° | Margin 20% (=50.0%-30.0%) >60°: 0.26°-0.76° <60°: 0.76°-1.03° |
| | Field of View full cone | Full FOV: Hemisphere (180°) Accurate FOV: +/−30° (60°) | 144° | 120° |
| Interfaces | Full system Mass | 400 g | 0.3 gr* | |
| | Sensor Dimensions (without electronics) | 120 × 120 × 60 mm | 2.5 × 2.5 mm2* | |
| | Electronic Dimensions (if deported) | 100 × 100 × 50 mm | | |
| | Average power consumption | 2 W | 6.3 μW* | |
| | Thermal accommodation | 2 W | 6.3 μW* | |
| | Supply voltage | 5 V regulated OR (12 V OR 28 V OR 50 V) unregulated | 3.3 V regulated | |
| | Data interface | Digital: type TBD (to be decided) | Digital | |
| Design and PA | Redundancy | Internal | No (large potential) | |
| | Lifetime | 15 years in GEO | Advanced testing +1 hour in rocket flight | |
| | Thermal cycles | 7000 | Unknown | |
| | Reliability | 100FIT @30° C. | Unknown | |
| | Radiation | Electronic components: 100 Krad Optics: 300 Krad Detector (if any): 1 Mrad SEU tolerant | Probably at least standard COTS (50-70 krad) | |

-continued

| The AO8884 specifications | | | |
|---|---|---|---|
| Fields | Requirements | Specification | L-sensor |
| | No ITAR components | ITAR free | ITAR free |
| | Dynamics | Angular rate: +/−100% i.e. 100 S/s | 11300 S/s (spinning rocket) |
| Environment | Temperature | Storage and operational −40 to +75° C. Extension for Solar Array accommodation: −80 to +100° C. (TBC) | Unknown but probably minimum −40° to +125° |
| | Vibration and shocks | Sine: 20 g peak Random: 27 g rms Shock: 3000 g from 2 to 10 kHz | Ok for sensor itself, depends on packaging |

*This is for the sensor element alone. However, there is only a very limited need for additional electronics, hence the power consumption will still be low compared with the alternatives. The increment in size, weight etc. will only be necessary packing, PCB etc.

The L-sensor may be summarised as follows:

Two orthogonal sensor lines
- Reduced area and reduced power compared to standard pixel matrix solutions. Same performance.
- Better position and better elimination of false sun sources (reflection, ghost etc.) than analogue systems Event-driven
- Reduced power consumption and increases speed Analog part is limited to a simple comparator in each pixel cell.
- This improves the radiation tolerance and reduces noise sensitivity In one embodiment, the sensor module may be summarised as follows:

The modules are based on a tetrahedron with sensor circuits on three sides (not the bottom)
- Gives a total FOV over 180° (hemisphere).

Each sensor circuit contains three sensor units, each belonging to three different power and signal domains. The domains are completely redundant and each domain offers full FOV
- Increased reliability, flexibility, accuracy and precision
- A short temporary fault in one domain (particle hit etc.) will be ruled down by the two others constituting the majority.
- A longer temporary fault may allow one domain to be shut down and restarted while the other two are still working.
- A permanent fatal fault in one domain will not influence on the other two that maintains full service.
- If one domain offers sufficient performance the two others may be switched off to save power All sensor circuits are equal. All circuits contain three sensor elements, domain master, module master and full interface circuitry. However only one module master is active at a time.
- Simplifies logistics and development. Only one device has to be developed and contains everything to establish a compact complete system with three circuits.
- Distributed digital signal processing along each sensor line
- Filter single and double stuck-low pixels
- Filter up to triple stuck-high pixels
- Fins the centre of light gravity
- May be bypassed and switched off to save power Graded pixel shielding to compensate for the reduced sensitivity towards the ends.
- Gives more equal sensitivity along the sensor line.
- Useful for a number of other applications Relative displacement of ⅓ pixel pitch between the three sensor units on each chip.
- Increased resolution by ⅓.

The sensor measuring system may comprise two sensor modules physically separated and positioned with opposite directions on a spacecraft. Each module has a 180° field of view (FOV) plus some overlap.

FIG. 4 shows a tetrahedral sensor module. The sensor module is based on three sensor circuits placed on three sides of a tetrahedron pyramid and where the shared corner (D) is orthogonal. The pyramid may or may not include a top cap. A sensor circuit is an integrated circuit comprising pixel cells, some control circuitry and some power control. This structure ensures that we can offer a FOV larger than 180° based on sensor elements that have only a FOV a little above 120° themselves. The structure covers all angels above the tetrahedron ground floor and some below.

As can be seen from FIG. 2, the shape of the L sensor unit leaves a significant part of the area unused. In the sensor circuit the L-sensor unit is tripled and each unit connected to a different independent signal and power domain. With this solution we will have three sensor domains, all represented in all directions. Each domain has a FOV above 180°. The signal and power (including pad pin supply) is completely independent. The only common terminal is ground.

FIG. 6 shows a schematic of the domains for each sensor circuit. The shape of the L sensor unit leaves a significant part of the area unused in the known version. In the disclosed sensor circuit the L-sensor unit is tripled and each unit connected to a different independent signal and power domain. With this solution there are three sensor domains, all represented in all directions. Each domain has a FOV above 180°. The signal and power (including pad pin supply) is completely independent. The only common terminal is ground.

As can be seen from FIG. 2, each sensor element comprises three L-shaped sensor structures, some digital signal processing, power control and a bus interface. With the disclosed L-sensor it is possible to have three completely independent (including power) L-sensors on the same device. Thus, any failure on one L-sensor will not influence the others. When they are working well, data from all can be combined to improve the resolution etc.

The three-dimensional sensor structure may have three independent and equal digital signal processing modules (shown flat in FIG. 6). The three different and completely independent power domains are illustrated by different shading/colouring. If one is short-circuited it will not influence the others (except for the missing data from this domain). Two of the sensors on each device belong to the neighbour's power domain. Thus, for example (the red) DSP1, S11, S21 (on device 2) and S31 (on device 3) belong together. This is also the case for the interfaces i.e. power for IO-pads etc. If both device 2 and 3 malfunction, device 1 still has sensors in all directions and can offer a complete half sphere (≥180°) FOV. If all devices work well, each DSP have access to all nine sensors and can utilise this for improved resolution.

The L-sensor has been designed in a standard 350 μm CMOS-process from AMS (Austria Micro Systems). It was developed for sounding rockets and thus did not need the long-time radiation resistance required in this application. However, IDEAS has developed a radiation tolerant library for the same process that has been characterised to the requested radiation levels. This is a library that has been developed and that has confirmed its stability over a long time.

In one embodiment, the disclosed L-sensor comprises two 256 pixels long one-pixel wide lines of sensors orthogonally oriented in an L-shape. The three L-sensors on an element may be internally shifted ⅓-pixel pitch. This increases reliability and resolution. The L-sensor may be based on event-signalling. The pixels comprises a PN-diode where charge generated from the incoming light increases the voltage over a capacitance. When a threshold is passed the pixel generates an event signal. This reduces the analog part to an absolute minimum. There is no need for analog signalling, shared analog parts, ADCs etc. with the advantages this gives for reliability, radiation tolerance, noise tolerance, processing speed and power consumption. The allowed time window for events may be given by a fixed number (default) of clock cycles of the master clock, by a programmable number of cycles or by a programmable number of events.

The following Table provides an overview of the features of the ESA AO8884 tender specifications compared to the L-sensor and the disclosed sensor module.

| | | The ESA AO8884 tender specifications | | |
|---|---|---|---|---|
| Fields | Requirements | Specification | L-element | Sensor module |
| Cost | | 400000EUR | L-sensor adapted to FOV = 120° (d = 651 μm) | Three new elements In tetrahedron |
| TRL | | 5 | | |
| Functional | Output | Sun direction in SC frame | Sun direction as pixel XY coordinates of brightest cells | Sun direction in SC frame |
| Performance (over full thermal & dynamic environment) | Angular accuracy (including tolerance to solar flares, SEU, albedo and straylight) | Over full FOV (180°): 5° (3σ) Accurate FOV (60°): 1° (3σ) (target 0.5°) | Margin 20% (=50.0%-30.0%) >60°: 0.26°-0.76° <60°: 0.76°-1.03° | Margin: 70% (=100%-30%) 0.16-0.5° |
| | Field of View full cone | Full FOV: Hemisphere (180°) Accurate FOV: +/−30° (60°) | 120° | >180° |
| Interfaces | Full system Mass | 400 g | 0.3 gr* | 60 gr + packaging |
| | Sensor Dimensions (without electronics) | 120 × 120 × 60 mm | 2.5 × 2.5 mm2* | 25 mm + packaging |
| | Electronic Dimensions (if deported) | 100 × 100 × 50 mm | | 25 mm + packaging |
| | Average power consumption | 2 W | 6.3 μW* | <10 mW |
| | Thermal accommodation | 2 W | 6.3 μW* | <10 mW |
| | Supply voltage | 5 V regulated OR (12 V OR 28 V OR 50 V) unregulated | 3.3 V regulated | 5 V |
| | Data interface | Digital: type TBD (to be decided) | Digital | Digital |
| Design and PA | Redundancy | Double | No (large potential) | Almost 100% triple |
| | Lifetime | 15 years in GEO | Advanced testing + 1 hour in rocket flight | 15 years in GEO |
| | Thermal cycles | 7000 | Unknown | 7000 |
| | Reliability | 100FIT @30° C. | Unknown | 100FIT @30° C. |
| | Radiation | Electronic components: 100 Krad Optics: 300 Krad Detector (if any): 1 Mrad SEU tolerant | Probably at least standard COTS (50-70 krad) | According to requirements |
| | No ITAR components | ITAR free | ITAR free | ITAR free |
| Environment | Dynamics | Angular rate: +/−100% i.e. 100 S/s | 11300 S/s (spinning rocket) | 11300 S/s |
| | Temperature | Storage and operational_−40 to +75° C. Extension for Solar Array accommodation: −80 to +100° C. (TBC) | Unknown but probably minimum −40° to +125° | According to requirements |
| | Vibration and shocks | Sine: 20 g peak Random: 27 g rms Shock: 3000 g from 2 to 10 kHz | Ok for sensor itself, depends on packaging | According to requirements |

FIG. 7 shows a schematic of the module logical hierarchy. All domains have a domain master. Under the domain master there are three sensor units situated on the three different sensor circuits. All sensor circuits do also have a module master but only one is active at a time. The module master combines the information from the domain masters and forwards the final data to the external user. The module master does all the interface with the external world. It receives set up data and forwards this to the three domain masters. If the module master fails one of the other module masters are ready to take over in short time.

FIG. 5 shows an example of what the sensor circuit may look like. The top and right edge shows the interface towards the sensor units on the two other sensor circuits. At the left side we have a bus for communication between the module masters. At the bottom left there are a bus for external communication. The circuit comprises three L-shaped sensor units, domain master and a module master as already mentioned. It does also contain a block with protocols etc. for external communications (e.g. SpaceWire, SPI etc.). The last block is a power management, measurement and control block. This block measures the current drained by this domain, and turns off the supply if the current passes a certain limit.

FIG. 8 shows shifted pixel lines. The three pixel lines are shifted by ⅓ pixel pitch relative to each other. By combining the information from all domains this will improve the resolution to ⅓ of what each domain may support alone.

The sensor unit communication and states will now be described. In addition to power (and ground) there are five wires between each sensor unit and the domain master: CLK, R/W, EN, X and Y. The first three are one-way directions from the domain master towards the sensor unit. The last two are bidirectional where the direction is controlled by the R/W signal.

The sensor unit has four main modes:
  Sidle is the idle mode. This mode can be reached by putting EN high and setting R/W in write position.
  Smeasure is the measure mode where pixels are accumulating light. The pixels are resat the first time EN is low after this mode is entered. When EN goes high pixel events are stored in SR-latches and pulses forwarded on the X and Y wires. When EN goes low again further event pulses are inhibited from the event bus and from setting the SR-latches.
  Sshift is the mode where data are shifted out of the sensor unit or register setups are shifted in. Whether data is read out or registers setups are shifted in depends on the R/W signal.
  Soptimize is a mode where the distributed digital filter is activated. The filter will try to eliminate single and double stuck-low and stuck-high (depending on the setup) and find the light gravity point.

The distributed digital signal processing will be described with reference to FIG. 10. After the end of a measurement (Smeasure period) a simple and distributed signal processing takes place along the sensor. First any single zeros (surrounded by ones) are replaced by a one (see FIG. 10, stage t0 to t1). This is to filter out stuck-at-zero pixels, filters with low gain etc. Then an opposite filtering takes place where pixels that have a neighbour with a zero value (or is zero itself) are set to zero (see FIG. 10, stage t1 to t2 to t3 to t4). This will find the weight point for light (t4 pixel 5) and remove single ones (surrounded by zeroes) (t1 pixel 12). This process is repeated until the next step (t5) would have made all pixels zero. Then the pixel with a 1 closest to the control end (t4 pixel 5) will output its position on a common bus. If the next pixel along the line is one, this will be signalled to indicate that the weight point is between two pixels. This filtering is done with a simple distributed logic, requiring a few gates per pixel. The dynamic power consumption will be low since most of the pixels will remain 0.

The digital signal processing may be distributed along the pixel lines with a few logical gates at each pixel. This may provide a faster and better processing and possibly also less power consumption. Most of these nodes will remain '0' and there will only be a few of these gates that will toggle during use. This solution may give reduced power consumption e.g. if the static leakage current is significantly lower than the dynamic power consumption of toggling gates as it is in many CMOS technologies.

Each pixel may set a private latch if the signal passes a threshold level within the event time window. If the threshold is passed outside of the event time window the latch may not be influenced. The event window may be started with a reset pulse. Depending on the setup, the event window may close when, for example: a given time has passed, a number of events has been generated (one or more), and/or a certain time has passed since the last event signal. Given preferred parameters of the sensor device, on average 4.5 pixels will be illuminated by the light source (e.g. the sun). The light intensity is illustrated by line 1201 in FIG. 12.

There may be small differences in offset and gain between the pixels. This is illustrated with the stepped line 1202 in FIG. 12. If the event window is closed after only one or two events, the finally determined position (e.g. gravity point of light) will be somewhat to the left and reduce the resolution and accuracy. Hence it is important to keep open for a sufficient number of events (or for a sufficient time) to get a more correct gravity. Faulty pixels stuck dark or light or with a very low or high gain will complicate this. To improve this, the disclosed distributed digital signal processing may be used.

Figures 13, 14:
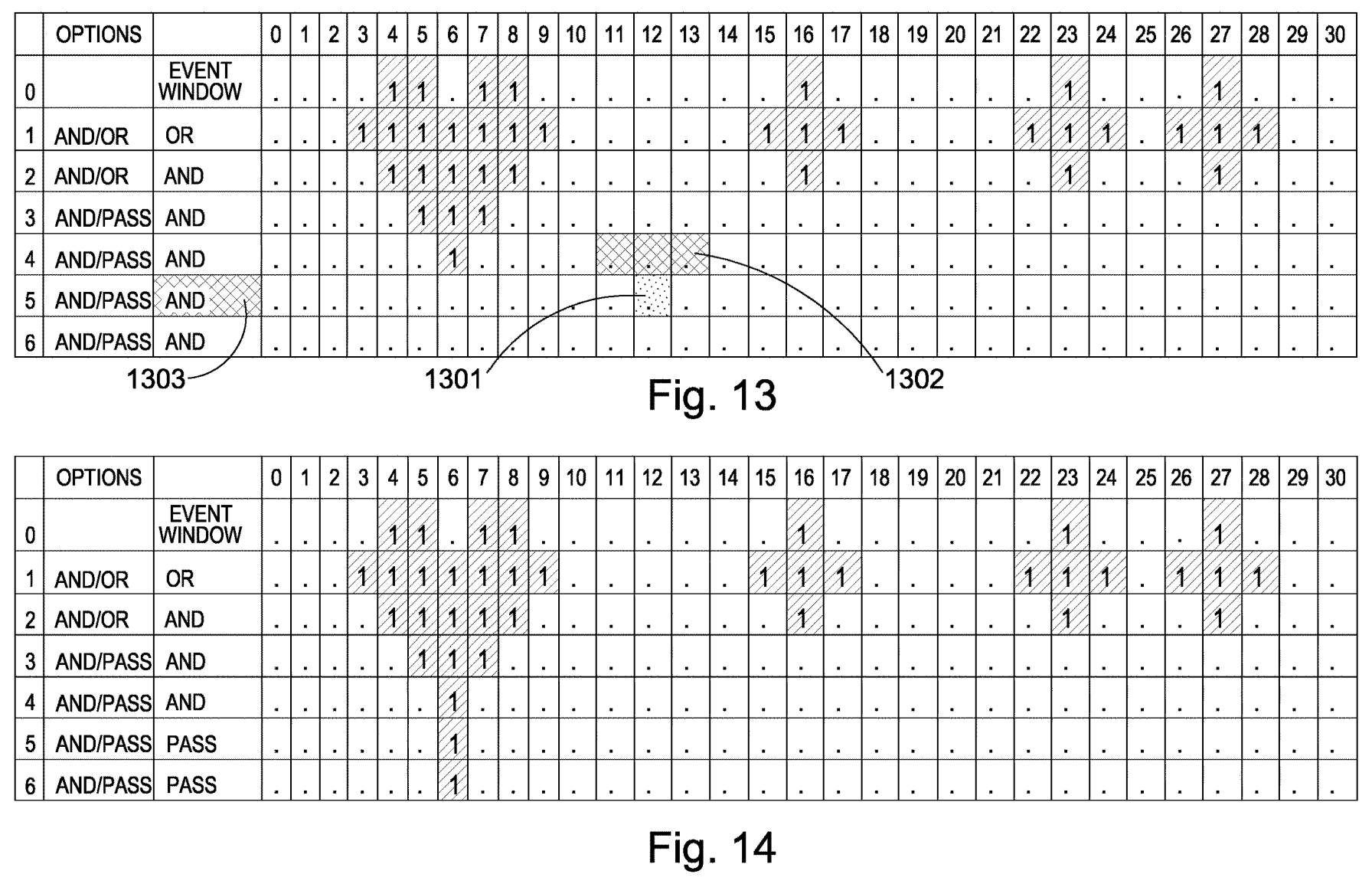

The table in FIG. 13 shows an example of the digital processing. The top row shows the pixel values (0 or 1) sampled during the event time window. The signal processing for each pixel goes vertically downwards. Each new value (example: orange pixel 1301) is decided from the three values above (example: blue pixels 1302) and the filter parameter (blue AND 1303). From each pixel there are a six stage signal line. At a stage there can be three possibilities: logical OR of the pixel and its neighbours, logical AND of the pixel and its neighbours and PASS which passes the signal without influence of the neighbours. Logical OR will eliminate stuck-at-zero pixels. Logical AND will both eliminate stuck-at-one and find the gravity point of the events. The two first stages of FIG. 13 have only the possibility of AND or OR while the last four stages have only the possibility of AND or PASS. The FIG. 13 shows the initial filter setup for the elimination of one faulty zero (as can be seen for pixel 6). With one OR, two ANDs are needed to cancel faulty 1's (pixel 16, 23 and 27).

After the initial setup above, there are no '1' in the bottom row. The filter parameters then have to be modified (see FIG. 14) until row 6 is not all-zero. To do this, row 6 is first changed to PASS. Since this does not help, row 5 is also changed to PASS. Now row 6 is not all zero and the gravity pixel is found in row 6.

Graded pixel shading may be applied to the sensor element. The L-sensor will be designed for a FOV a little above 120 degrees. An issue is that the light energy accumulated decreases with the cosine of the incoming light from 100% in the middle to 50% at an angle of 60 degrees. At 60° the sun will have 50% efficiency, but still higher signal than any other light source including reflections from the earth, the spacecraft etc. An option could be to compensate for this variation by covering with metal part of the sensitive pixel area corresponding to 1/(2 cos(α)) of the angle α (to the sensor normal vector). If this is done, the central pixels are covered 50% with metal and this is reduced to 0% at ±60 degrees. Except for the shielding, the pixels are made equal to give an as similar behaviour as possible.

FIG. 9B shows such a situation. The signal level will decrease towards the ends following a cosine behaviour. At 60 degrees it is 50%, but still above the maximum reflection from the Earth and other natural or artificial light sources. The upper line illustrates the sensitivity at different angels. The lower lines illustrate the albedo maximum strength from the Earth and Moon at 0 degrees (relative to the sun at 0 degrees).

Figure 9C:
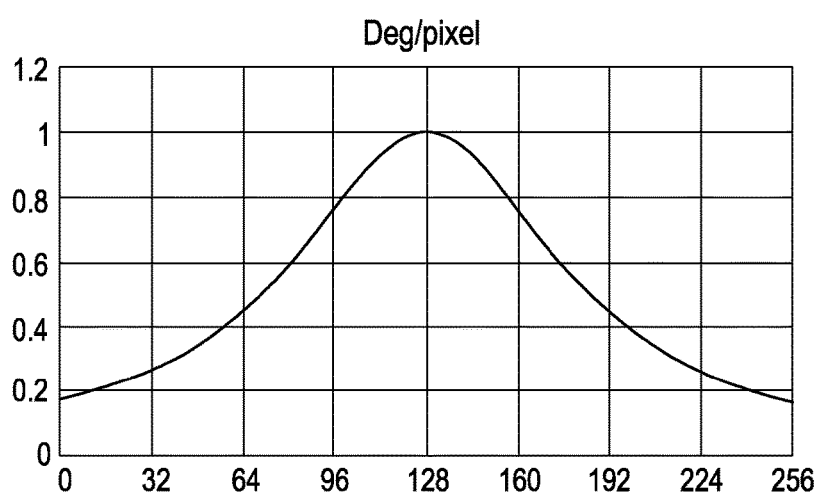

As shown in FIG. 9C, with fixed pixel pitch the degree resolution will be worst in the middle and improve towards the ends. The intended filtering and combination of position data from three domains will improve the resolution further.

With regard to the domain master (i.e. unit controller) functionality, the Domain Masters receive position data from three different sensor elements each, all together covering the entire hemisphere. First it decides which has the strongest signal and selects this as the likely position of the sun. Then it has to transform the local X-position of the element to the global φ-position of the sensor module. First the angle is calculated from the position according to α=90−arctan((d+Δd)/(L+ΔL)) where L is the position of pixel, d is the intendent distance between the sensor and the slotted shield and (ΔW and ΔL) is production variables. The addition and division have to be calculated on site while the arctan probably requires a look-up table. The angle in the local Y-direction is the global θ. To do this, each element has to know its position within the module. This is given by a hardwired input on two pins.

Based on the hardwired position information, the angle (X-position) is added by default by either 0 degrees, 120 degrees or 240 degrees. An option may be to alternatively select programmable values to compensate for variations due to inaccurate mechanical position of the sensor elements etc. The variation in the angle of the substrate may be scientifically (and/or significantly) less than the measurement resolution and thus may be ignored.

| Element code | Left sensor | This sensor | Right sensor |
| --- | --- | --- | --- |
| 00 | 0° | 0° | 0° |
| 01 | 240° | 0° | 120° |
| 10 | 0° | 120° | 240° |
| 11 | 120° | 240° | 0° |

All of the processing above takes place in parallel in three completely signal and power independent domains (illustrated with shading/colouring in the figures). This generates three position pairs that may be different due to measurement variations or to more serious permanent or temporal errors.

The module master functionality will now be described with reference to FIG. 11. From the three positions generated by the Domain Masters the Module Master chooses the middle φ-position and the middle θ-position and forwards them to the spacecraft host system. This procedure will filter out an incorrect φ-position and an incorrect θ-position. If they are all correct, it will generate the most accurate one, improving the resolution. The only process required by the satellite host computer is to know which of the two sensor modules it receives data from and compensate for that in the θ-direction.

This Module Master is an important point when it comes to redundancy. Although all three elements (i.e. sensor devices) contain this module, only one can forward the data to the host computer. The Module Master will be selected from a sequence based on the hardwired position information. If a module does not have power, the task will be left to the next in the sequence.

The invention claimed is:

1. A sensor device for determining a position of a light source, the sensor device comprising:
a plurality of sensor units, each sensor unit of the plurality of sensor units having a respective sensor area; and
a mask disposed above the plurality of sensor units and arranged such that incident light from the light source will illuminate different regions of the sensor area of each sensor unit of the plurality of sensor units depending on a position of the light source relative to the sensor device, so that the position of the light source may be determined based on which regions of the sensor areas of the plurality of sensor units are illuminated;
wherein each sensor unit of the plurality of sensor units is arranged to be controlled by a respective unit controller of a plurality of unit controllers to determine the position of the light source;
wherein each sensor unit of the plurality of sensor units comprises a first strip and a second strip arranged substantially orthogonal to the first strip, and wherein the mask is arranged such that the light source will illuminate regions of the first strip and the second strip of each sensor unit simultaneously.

2. A sensor device as claimed in claim 1, wherein the sensor units of the plurality of sensor units are positioned adjacent one another.

3. A sensor device as claimed in claim 1, wherein the mask comprises a first transparent slit and a second transparent slit arranged substantially orthogonal to the first transparent slit.

4. A sensor device as claimed in claim 3, wherein each sensor unit comprises a first strip and a second strip arranged substantially orthogonal to the first strip, the first transparent slit is substantially orthogonal to the first strip of each sensor unit, and the second transparent slit is substantially orthogonal to the second strip of each sensor unit.

5. A sensor device as claimed in claim 1, wherein each of the first strip and the second strip of each sensor unit comprises a plurality of pixels, and wherein the pixels of each strip of the first strip and second strip of each sensor unit are offset from the pixels of each adjacent first strip or second strip of other sensor units of the plurality of sensor units by a distance less than a width of each pixel in the direction of offset.

6. A sensor device as claimed in claim 1, further comprising graded shielding to reduce intensity of light incident on the plurality of sensor units so as to counteract a relative intensity decrease of light incident on the sensor unit at an angle.

7. A sensor device as claimed in claim 1, wherein each sensor unit of the plurality of sensor units is arranged to be part of a respective power domain.

8. A sensor device as claimed in claim 1, wherein each sensor unit of the plurality of sensor units is connected to an independent signal domain and connected to an independent power domain.

9. A sensor module for determining a position of a light source, the sensor module comprising:
- a plurality of sensor devices, wherein each sensor device of the plurality of sensor devices is a sensor device as recited in claim 1; and
- a plurality of unit controllers, wherein each sensor device comprises one corresponding unit controller of the plurality of unit controllers that is configured to control one sensor unit in each sensor device of the plurality of sensor devices.

10. A sensor module as claimed in claim 9, wherein each unit controller of the plurality of unit controllers belongs to a respective power domain.

11. A sensor module as claimed in claim 9, further comprising a plurality of module controllers, wherein each module controller of the plurality of module controllers is configured to control each unit controller of the plurality of unit controllers.

12. A sensor module as claimed in claim 9, further comprising a base and three sensor devices of the plurality of sensor devices arranged on respective faces of the base, wherein the base has a shape corresponding to at least a portion of a tetrahedron.

13. A sensor module as claimed in claim 9, wherein the plurality of sensor devices comprises three sensor devices each positioned parallel to a different surface plane of a tetrahedron, with one sensor device of the three sensor devices on each surface plane facing outwards.

14. A sensor module as claimed in claim 9, wherein the sensor module is embodied in a sun sensor for a satellite.

15. A sensor module as claimed in claim 9, arranged to have a field of view of at least a hemisphere for detection of the light source.

16. A sensor system for determining a position of a light source, the sensor system comprising a plurality of sensor modules, wherein each sensor module of the plurality of sensor modules is a sensor module as claimed in claim 10, and wherein each sensor module of the plurality of sensor modules is arranged to have a different field of view for detection of the light source.

17. A method of determining a position of a light source using a sensor device as recited in claim 1, the method comprising:
- determining the position of the light source to be an average of the positions determined by the sensor units of the plurality of sensor units.

18. A method of determining a position of a light source using a sensor device as recited in claim 1, the method comprising:
- (i) reading digital output pixel values from one sensor unit of the plurality of sensor units;
- (ii) setting to 1 any pixel values neighboring pixel values of 1;
- (iii) setting to 0 any pixels values neighboring a 0 value;
- (iv) repeating step (iii) until performing step (iii) one more time would result in all pixel values of the sensor unit being set to 0; and
- (v) determining the position of the light source using the remaining non-zero pixel or pixels.

19. A method as claimed in claim 18, comprising repeating step (ii) a plurality of times.

* * * * *